United States Patent
Russo et al.

(10) Patent No.: US 10,004,987 B2
(45) Date of Patent: *Jun. 26, 2018

(54) WIRELESS GAMING PROTOCOL

(71) Applicant: Microsoft Technology Licensing, LLC, Redmond, WA (US)

(72) Inventors: David Russo, Woodinville, WA (US); Ranveer Chandra, Bellevue, WA (US); Hang Yu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/263,092

(22) Filed: Sep. 12, 2016

(65) Prior Publication Data

US 2017/0065882 A1 Mar. 9, 2017

Related U.S. Application Data

(63) Continuation of application No. 13/900,487, filed on May 22, 2013, now Pat. No. 9,492,741.

(51) Int. Cl.
*H04L 12/26* (2006.01)
*A63F 13/31* (2014.01)
(Continued)

(52) U.S. Cl.
CPC .............. *A63F 13/31* (2014.09); *A63F 13/12* (2013.01); *A63F 13/327* (2014.09);
(Continued)

(58) Field of Classification Search
CPC ....................................................... H04L 43/00
(Continued)

(56) References Cited

U.S. PATENT DOCUMENTS

| 6,041,048 A | 3/2000 | Erickson et al. |
| 6,424,626 B1 | 7/2002 | Kidambi et al. |

(Continued)

FOREIGN PATENT DOCUMENTS

| CN | 1894914 B | 1/2007 |
| EP | 1953974 A1 | 8/2008 |

(Continued)

OTHER PUBLICATIONS

Response filed Jan. 5, 2017 to the Office Action dated Nov. 21, 2016 from European Patent Application No. 16172235.0, 10 pages.

(Continued)

*Primary Examiner* — Adnan Mirza
(74) *Attorney, Agent, or Firm* — Rainier Patents, P.S.

(57) ABSTRACT

Example apparatus and methods concern establishing, maintaining, managing, or terminating communications between an access point and a client in a wireless network used by a shared, wireless gaming system. An example apparatus may include a first logic configured to control timing for the protocol and a second logic configured to control message exchange for the protocol. Controlling timing and message exchange facilitates reducing contention in the wireless gaming environment. Contention may lead to latency. A user gaming experience may depend on reducing latency. Therefore, reducing latency may produce an improved gaming experience. Controlling timing and message exchange also facilitates reducing power consumption by clients (e.g., accessories, controllers), which in turn facilitates improving battery life for clients.

20 Claims, 24 Drawing Sheets

(51) Int. Cl.

| | | |
|---|---|---|
| *A63F 13/525* | (2014.01) | |
| *A63F 13/30* | (2014.01) | |
| *H04W 72/02* | (2009.01) | |
| *H04W 52/02* | (2009.01) | |
| *H04W 72/04* | (2009.01) | |
| *A63F 13/327* | (2014.01) | |
| *A63F 13/493* | (2014.01) | |
| *H04L 29/06* | (2006.01) | |
| *H04W 28/06* | (2009.01) | |
| *H04W 74/00* | (2009.01) | |

(52) U.S. Cl.
 CPC .......... *A63F 13/493* (2014.09); *A63F 13/525* (2014.09); *H04W 52/0232* (2013.01); *H04W 72/02* (2013.01); *H04W 72/0486* (2013.01); *H04L 43/00* (2013.01); *H04L 69/24* (2013.01); *H04W 28/065* (2013.01); *H04W 74/00* (2013.01); *Y02B 60/50* (2013.01)

(58) Field of Classification Search
 USPC .................................................. 709/224, 225
 See application file for complete search history.

(56) References Cited

U.S. PATENT DOCUMENTS

| | | | |
|---|---|---|---|
| 6,684,062 | B1 | 1/2004 | Gosior et al. |
| 6,721,271 | B1 | 4/2004 | Beshai et al. |
| 6,721,334 | B1 | 4/2004 | Ketcham |
| 6,807,159 | B1 | 10/2004 | Shorey et al. |
| 6,898,198 | B1 | 5/2005 | Ryan et al. |
| 6,917,598 | B1 | 7/2005 | Emeott et al. |
| 7,046,651 | B2 | 5/2006 | Terry |
| 7,224,970 | B2 | 5/2007 | Smith et al. |
| 7,227,839 | B2 | 6/2007 | Forssell et al. |
| 7,251,232 | B1 | 7/2007 | Meier |
| 7,298,716 | B2 | 11/2007 | Abraham et al. |
| 7,319,666 | B2 | 1/2008 | Goosman |
| 7,366,202 | B2 | 4/2008 | Scherzer et al. |
| 7,395,064 | B2 | 7/2008 | Demirhan et al. |
| 7,403,488 | B2 | 7/2008 | Gu et al. |
| 7,430,400 | B2 | 9/2008 | Russo et al. |
| 7,443,821 | B2 | 10/2008 | Cave et al. |
| 7,457,973 | B2 | 11/2008 | Liu |
| 7,463,892 | B2 | 12/2008 | Eiger et al. |
| 7,466,690 | B2 | 12/2008 | Schrodi |
| 7,535,877 | B2 | 5/2009 | Wang |
| 7,564,810 | B2 | 7/2009 | Hernandez et al. |
| 7,590,061 | B2 | 9/2009 | Barry et al. |
| 7,593,339 | B2 | 9/2009 | Shoemake et al. |
| 7,613,191 | B2 | 11/2009 | Lin |
| 7,623,448 | B1 | 11/2009 | Vrzic et al. |
| 7,623,494 | B2 | 11/2009 | Zhu et al. |
| 7,733,835 | B2 | 6/2010 | Sammour et al. |
| 7,773,601 | B2 | 8/2010 | Nakajima et al. |
| 7,787,411 | B2 | 8/2010 | Lum et al. |
| 7,948,897 | B2 | 5/2011 | Stuart et al. |
| 8,014,818 | B2 | 9/2011 | Grandhi et al. |
| 8,045,574 | B2 | 10/2011 | Sherman et al. |
| 8,059,607 | B1 | 11/2011 | Shaw et al. |
| 8,072,910 | B2 | 12/2011 | Thubert et al. |
| 8,125,941 | B2 | 2/2012 | Trainin et al. |
| 8,130,742 | B2 | 3/2012 | Smith et al. |
| 8,194,626 | B2 | 6/2012 | Moorti et al. |
| 8,274,992 | B2 | 9/2012 | Nishibayashi et al. |
| 8,339,948 | B2 | 12/2012 | Ramprashad et al. |
| 8,351,997 | B2 | 1/2013 | Liu et al. |
| 8,385,272 | B2 | 2/2013 | Gaur |
| 8,401,594 | B2 | 3/2013 | Zhang et al. |
| 8,432,938 | B2 | 4/2013 | Singh et al. |
| 8,542,586 | B2 | 9/2013 | Kuhn |
| 8,547,853 | B2 | 10/2013 | Du et al. |
| 8,553,617 | B1 | 10/2013 | Shmidt |
| 8,576,760 | B2 | 11/2013 | Gorokhov et al. |
| 8,576,761 | B1 | 11/2013 | Pitchaiah |
| 8,619,652 | B2 | 12/2013 | Singh et al. |
| 8,625,570 | B2 | 1/2014 | Chu et al. |
| 8,630,255 | B1 | 1/2014 | Kunz et al. |
| 8,666,319 | B2 | 3/2014 | Kloper et al. |
| 8,677,195 | B2 | 3/2014 | Kim et al. |
| 8,699,333 | B2 | 4/2014 | Vasseur et al. |
| 8,705,340 | B2 | 4/2014 | Gong et al. |
| 8,711,815 | B2 | 4/2014 | Piipponen et al. |
| 8,718,089 | B2 | 5/2014 | Famolari |
| 8,718,560 | B2 | 5/2014 | Jin et al. |
| 8,724,469 | B2 | 5/2014 | Verma et al. |
| 8,730,802 | B2 | 5/2014 | Munje |
| 8,730,960 | B2 | 5/2014 | Hart et al. |
| 8,730,990 | B2 | 5/2014 | Ghosh et al. |
| 8,787,188 | B1 | 7/2014 | Shmidt |
| 8,824,378 | B2 | 9/2014 | Wentink |
| 8,837,478 | B1 | 9/2014 | Nemavat et al. |
| 8,842,657 | B2 | 9/2014 | Walton et al. |
| 8,855,088 | B2 | 10/2014 | Cordeiro |
| 8,897,222 | B2 | 11/2014 | Sundberg |
| 8,934,368 | B2 | 1/2015 | Kostic et al. |
| 8,942,123 | B2 | 1/2015 | Merlin et al. |
| 2001/0053152 | A1 | 12/2001 | Sala et al. |
| 2004/0165532 | A1 | 8/2004 | Poor et al. |
| 2005/0009578 | A1 | 1/2005 | Liu |
| 2005/0025174 | A1 | 2/2005 | Fischer et al. |
| 2005/0047481 | A1 | 3/2005 | Lyle et al. |
| 2005/0201340 | A1 | 9/2005 | Wang et al. |
| 2005/0286440 | A1 | 12/2005 | Strutt et al. |
| 2006/0009161 | A1 | 1/2006 | Beecher |
| 2006/0056421 | A1 | 3/2006 | Zaki |
| 2006/0072502 | A1 | 4/2006 | Crandall et al. |
| 2006/0084504 | A1 | 4/2006 | Chan et al. |
| 2006/0172802 | A1 | 8/2006 | Hussaini et al. |
| 2006/0227802 | A1 | 10/2006 | Du et al. |
| 2007/0060155 | A1 | 3/2007 | Kahana et al. |
| 2007/0165590 | A1 | 7/2007 | Kneckt et al. |
| 2007/0165593 | A1 | 7/2007 | Hundal et al. |
| 2007/0183326 | A1 | 8/2007 | Igarashi et al. |
| 2007/0211682 | A1 | 9/2007 | Kim et al. |
| 2007/0218860 | A1 | 9/2007 | Wentink |
| 2007/0281617 | A1 | 12/2007 | Meylan et al. |
| 2008/0112424 | A1 | 5/2008 | Kim et al. |
| 2008/0205358 | A1 | 8/2008 | Jokela |
| 2009/0086802 | A1 | 4/2009 | Nabetani |
| 2009/0147678 | A1 | 6/2009 | Xhafa et al. |
| 2010/0278065 | A1 | 11/2010 | Sun et al. |
| 2011/0019557 | A1 | 1/2011 | Hassan et al. |
| 2011/0116371 | A1 | 5/2011 | James |
| 2012/0184242 | A1 | 7/2012 | Li et al. |
| 2012/0195244 | A1 | 8/2012 | Wentink et al. |
| 2013/0170432 | A1 | 7/2013 | O'Brien et al. |
| 2013/0223419 | A1 | 8/2013 | Ghosh et al. |
| 2014/0044106 | A1 | 2/2014 | Bhagwat |
| 2014/0071956 | A1 | 3/2014 | Park et al. |
| 2014/0098681 | A1 | 4/2014 | Stager et al. |
| 2014/0125391 | A1 | 5/2014 | Liu et al. |
| 2014/0254552 | A1 | 9/2014 | Hayes et al. |
| 2014/0349745 | A1 | 11/2014 | Russo et al. |
| 2014/0357269 | A1 | 12/2014 | Zhou et al. |
| 2015/0009878 | A1 | 1/2015 | Kim et al. |
| 2015/0032868 | A1 | 1/2015 | Sung et al. |
| 2015/0055546 | A1 | 2/2015 | Jalarian et al. |

FOREIGN PATENT DOCUMENTS

| | | |
|---|---|---|
| EP | 2111053 A1 | 10/2009 |
| KR | 20140081500 A | 7/2014 |
| WO | 2004098735 A1 | 11/2004 |
| WO | 2007028252 A2 | 3/2007 |
| WO | 2008012789 A1 | 1/2008 |
| WO | 2011072437 A1 | 6/2011 |
| WO | 2013082710 A1 | 6/2013 |
| WO | 2014056155 A1 | 4/2014 |

(56) References Cited

FOREIGN PATENT DOCUMENTS

| | | |
|---|---|---|
| WO | 2014071308 A1 | 5/2014 |
| WO | 2014155031 A1 | 10/2014 |

OTHER PUBLICATIONS

"Notice of Allowance Issued in European Patent Application No. 14735724.8", dated May 13, 2016, 7 pages.

"Notice of Allowance Issued in European Patent Application No. 16172235.0", dated Feb. 20, 2017, 7 pages.

"Broadcom Advances the Wireless Gaming Experience with Bluetooth® and Wi-Fi® Technologies Integrated Into Nintendo's Wii™ Game Console", captured by the Internet archive at <<http://investor.broadcom.com/releaseDetail.cfm?releaseid=351416>>, May 20, 2006, 2 pages.

"Video Game Console", captured by the Internet archive at <<http://www.electronics-manufacturers.com/info/video-equipment/video-game-console.html>>, Jan. 6, 2007, 2 pages.

Fu et al., "Dynamic Rate Adaptation for Improved Throughput and Delay in Wireless Network Coded Broadcast," Journal of IEEE/ACM Transactions on Networking, vol. 22, Issue 6, Dec. 1, 2014, 14 pages.

Yaghmaee et al., "Priority-based Rate Control for Service Differentiation and Congestion Control in Wireless Multimedia Sensor Networks," Proceedings of Computer Networks, Mar. 3, 2009, 14 pages.

Ahuja, Sanjay P., "IEEE 802.11—WiFi," retrieved on Mar. 13, 2015 at <<http://slideplayer.com/slide/3891660/>>, 24 pages.

Kim et al., "Downlink and Uplink Resource Allocation in IEEE 802.11 Wireless LANs," Proceedings of IEEE Transactions on Vehicular Technology, vol. 54, Issue 1, Jan. 2005, pp. 320-327, 8 pages.

Majkowski et al., "Enhanced TXOP Scheme for Efficiency Improvement of WLAN IEEE 802.11e," Proceedings of IEEE 64th Vehicular Technology Conference, Sep. 25, 2006, 5 pages.

Reddy et al., "Providing Mac QoS for Multimedia Traffic 802.11e Based Multi-Hop Ad Hoc Wireless Networks," Journal of Computer Networks, vol. 51, Issue 1, Jan. 17, 2007, pp. 153-176, 24 pages.

Dely et al., "An Experimental Companson of Burst Packet Transmission Schemes in IEEE 802.11-based Wireless Mesh networks," Proceedings of IEEE Global Telecommunications Conference, Dec. 6, 2012, 5 pages.

Ahn et al., "A Fair Transmission Opportunity by Deetecting and Punishing the Malicious Wireless Stations in IEEE 802.11e EDCA Network," IEEE Systems Journal, vol. 5, No. 4, Dec. 4, 2011, pp. 485-494, 9 pages.

Majkowski et al., "Dynamic TXOP Configuration for Qos Enhancement in IEEE 802.11e Wireless LAN," Proceedings of International Conference on Software in Telecommunications and Computer Networks, Sep. 29, 2006, 5 pages.

Leith et al., "Max-min Fairness in 802.11 Mesh Networks," Proceedings of IEEE/ACM Transactions on Networking, vol. 20, Issue 3, Mar. 3, 2010, 14 pages.

Second Written Opinion dated Apr. 9, 2015 from PCT Patent Application No. PCT/US2014/039044, 9 pages.

International Search Report and Written Opinion dated Sep. 25, 2014 from PCT Patent Application No. PCT/US2014/039044, 11 pages.

Intention to Grant dated Apr. 5, 2016 from European Patent Application No. 14735724.8, 64 pages.

Response and Demand filed Nov. 17, 2014 from PCT Patent Application No. PCT/US2014/039044, 11 pages.

Response filed Jun. 8, 2015 to the Second Written Opinion dated Apr. 9, 2015 from PCT Patent Application No. PCT/US2014/039044, 8 pages.

Response filed Apr. 25, 2016 to the Official Communication dated Apr. 5, 2016 from European Patent Application No. 14735724.8, 8 pages.

Divisional Application with Amendments filed May 31, 2016 from European Patent Application No. EP16172235.0, 97 pages.

Non-Final Office Action dated Jan. 21, 2016 from U.S. Appl. No. 13/900,487, 68 pages.

Response filed Apr. 7, 2016 to the Non-Final Office Action dated Jan. 21, 2016 from U.S. Appl. No. 13/900,487, 14 pages.

Notice of Allowance dated Jul. 20, 2016 from U.S. Appl. No. 13/900,487, 17 pages.

International Preliminary Report on Patentability dated Jul. 6, 2015 from PCT Patent Application No. PCT/US2014/039044, 6 pages.

Keceli et al., "Fair Access Provisioning through Contention Parameter Adaptation in the IEEE 802.11e Infrastructure Basic Service Set," Proceedings of the Computing Research Repository, Jun. 2008, 78 pages.

Raghavendra et al., "IPAC: IP-based Adaptive Packet Concatenation for Multihop Wireless Networks," Proceedings of Fortieth Asilomar Conference on Signals, Systems and Computers, Oct. 29, 2006, 9 pages.

Karlsson et al., "An Aggregation Aware Multi-path Forwarding Paradigms for Wireless Meshed Networks," Proceedings of 8th International Conference on Mobile Ad-Hoc and Sensor Systems, Oct. 22, 2011, pp. 765-770, 6 pages.

Xiao, Yang, "Efficient MAC Strategies for the IEEE 802.11n Wireless LANs," Proceedings of Wireless Communications & Mobile Computing Journal, vol. 6, Issue 4, Jun. 2006, pp. 453-446, 14 pages.

Baccour et al., "External Radio Interference," Proceedings of Radio Link Quality Estimation in Low-Power Wireless Networks, Jun. 2013, 44 pages.

Liu et al., "Interference-Aware Transmission Power Control for Dense Wireless Networks," Proceedings of the Annual conference of ITA, Sep. 25, 2007, 7 pages.

Gummadi et al., "Understanding and Mitigating the Impact of RF Interference on 802.11 Networks," Proceedings of the Conference on Applications, Technologies, Architectures and Protocols for Computer Communications, Aug. 27, 2007, 14 pages.

Namboodiri et al., "Energy-Efficient VoIP over Wireless LANs," Proceedings of IEEE Transactions on Mobile computer, vol. 9, Issue 4, Aug. 21, 2009, pp. 1-15, 15 pages.

A et al., "Optimized Energy Conservation in WLAN Using Dynamic Sleep Scheduling," International Journal of Science and Research, vol. 3, Issue 11, Nov. 2014, pp. 679-682, 4 pages.

Zhang et al., "Traffice Aware Medium Access Control Protocol for Wireless Sensor Networks," Proceedings of 7th ACM International Symposium on Mobility Management and Wireless Access, Oct. 26-27, 2009, pp. 140-148, 9 pages.

Chintalapudi et al., "WiFi-NC: WiFi Over Narrow Channels," Proceedings of 9th USENIX Conference on Networked Systems Design and Implementation, Apr. 25, 2012, pp. 1-14, 14 pages.

Wie et al., "LEACH-Based Energy-Conserved Improved Protocol for WSNs," International Journal of Digital Content Technology and its Applications, vol. 1, No. 23, Dec. 2012, pp. 163-171, 9 pages.

Colom, Marc Sola, "Adaptive Interference Avoidance for IEEE 802.15.4," Master Thesis, date of issue Apr. 2008, retrieved on Mar. 13, 2015, 103 pages.

Murty et al., "Dyson: An Architecture for Extensible Wireless LANs," Proceedings of the USENIX Conference on Jsenix Annual Technical Conference, Jun. 23, 2010, 14 pages.

Dang et al., "A Graph Route-Based Superframe Scheduling Scheme in WirelessHART Mesh Networks for High Robustness," Journal of Wireless Personal Communications, vol. 71, Issue 4, Aug. 1, 2013, 14 pages.

Ganu et al., "Architecture and Prototyping of an 802.11-bases Self-Organizing Hierarchical Ad-Hoc Wireless Network (SOHAN)", Proceedings of 15th IEEE International Symposium on Personal, Indoor and Mobile Radio communications, Sep. 5, 2004, 12 pages.

Nath et al., "Choosing Beacon Periods to Improve Response Times for Wireless HTTP Clients," Proceedings of the Second International Workshop on Mobility, Oct. 1, 2004, pp. 43-50, 8 pages.

(56) References Cited

OTHER PUBLICATIONS

Han et al., "DozyAP: Power-Efficient WiFi Tethering," Proceedings of the 10th International Conference on Mobile Systems, Applications and Services, Jun. 25-29, 2012, pp. 421-434, 14 pages.

Chatterjee et al., "Exploring Adaptive Power Saving Schemes for Mobile VoIP Devices in IEEE 802.11 Networks," Proceedings of the Second International Conference on Digital Telecommunications, Jul. 1, 2007, 7 pages.

Extended European Search Report dated Oct. 4, 2016 from European Patent Application No. 16172235.0, 5 pages.

Dang et al., "A Graph Route-Based Superframe Scheduling Scheme in WirelessHART Mesh Networks for High Robustness," Journal of Wireless Personal Communications, vol. 71, Issue 4, Aug. 1, 2013, pp. 2431-2444, 14 pages.

WIRELESS GAMING PROTOCOL

BACKGROUND

Gamers hate to wait, especially when facing their imminent virtual demise. When gamers press a button they want an action to occur as soon as possible, with no noticeable delays. Any perceived delays in the actions of the user's avatar are considered unacceptable. Any noticeable delay may be despised, and may be cause for selecting a different gaming system. Gamers also dislike changing the batteries in their handheld controllers. Few experiences are worse for the gamer than being on the cusp of a major victory only to have their controller battery die. Both latency and battery life can be functions of the amount of time and power involved in handling contention and collisions on a communications link between a console and a game controller.

In a conventional wired gaming system, a console may communicate with an accessory (e.g., handheld controller) using a carrier sense media access protocol that includes collision detection (CSMA/CD). The console may be able to exercise some central authority over the accessories to reduce or minimize collisions and thus to reduce or minimize latency between a button press and a corresponding action in a game. However, in a conventional wireless gaming system, the console may communicate with the accessory using a CSMA protocol with collision avoidance (CSMA/CA) instead of CSMA/CD. Communications may require contending for the opportunity to communicate. The contending may increase latency and may produce collisions. The contending may also increase the number of transmissions performed by an accessory, which may negatively affect battery life.

The amount of time and power spent contending for a communication medium may be directly related to the number of devices contending for the medium, or the number, type, or size of messages involved in contending for the medium. Latency and battery life may also be a function of what happens (e.g., handshaking, message passing) after an accessory has won a contention. The number, type, or size of messages involved in communications between the console and the accessory will affect the amount of time that elapses between a user action (e.g., button press, controller re-orientation) and a corresponding game action. The number, type, or size of messages involved in communications between the console and the accessory will also affect how much battery power is used per communication.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

In a wireless gaming system, the amount of latency experienced and the amount of power consumed may be both functions of contention and collisions. Latency concerns the amount of time an accessory (e.g., controller, client) waits for a response from a controller (e.g., console, access point). Power consumed concerns battery usage in an accessory. Contention and collisions may both be functions of the number of communicating devices, the protocol used for communications, and the number, type, or length of messages used to communicate. Contention and collisions may impact responsiveness, yet responsiveness and reliability may define the gaming experience for a user. Example apparatus and methods therefore concern reducing latency by addressing contention and collisions in a wireless gaming system.

Contention and collisions, and thus latency, may be directly related to network utilization. Example methods and apparatus may, therefore, acquire and distribute network utilization information. The network utilization information can be used to control, for example, network selection, channel selection, and other actions. The network utilization information may be used to facilitate having independent gaming systems peacefully co-exist in close proximity to each other without causing degraded performance. The network utilization information may also be used by a console. For example, the console may use the network utilization information to determine whether or how to prioritize accessories.

Example methods and apparatus concern establishing, maintaining, managing, or terminating a wireless connection between a radio in a gaming console and a radio in a gaming accessory. The accessory may be, for example, a handheld controller. The radio in the gaming console may communicate with radios in various accessories. The radio in the accessory may communicate with the radio in the console. Example methods and apparatus may establish, maintain, manage, or terminate the connection between the radios in accordance with a protocol. The protocol may define specific messages used in the protocol, including packet structures, packet definitions, or packet field definitions. The protocol may also define the sequences by which messages are exchanged.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

In a wireless gaming system, the amount of latency experienced and the amount of power consumed may be both functions of contention and collisions. Latency concerns the amount of time an accessory (e.g., controller, client) waits for a response from a controller (e.g., console, AP). Power consumed concerns battery usage in an accessory. Contention and collisions may both be functions of the number of communicating devices, the protocol used for communications, and the number, type, or length of messages used to communicate. Collisions may be a function of the number, type, or length of messages used to communicate. In computer networking, and herein, an access point (AP), or a wireless access point (WAP), is a device that allows wireless devices to communicate in a wireless network using, for example Wi-Fi. An AP may in turn connect, for example, to a router and provide access to wired networks, to the Internet, or to other networks. In computer networking, and herein, a client is a device that communicates in the wireless network using the AP.

Figure 1:
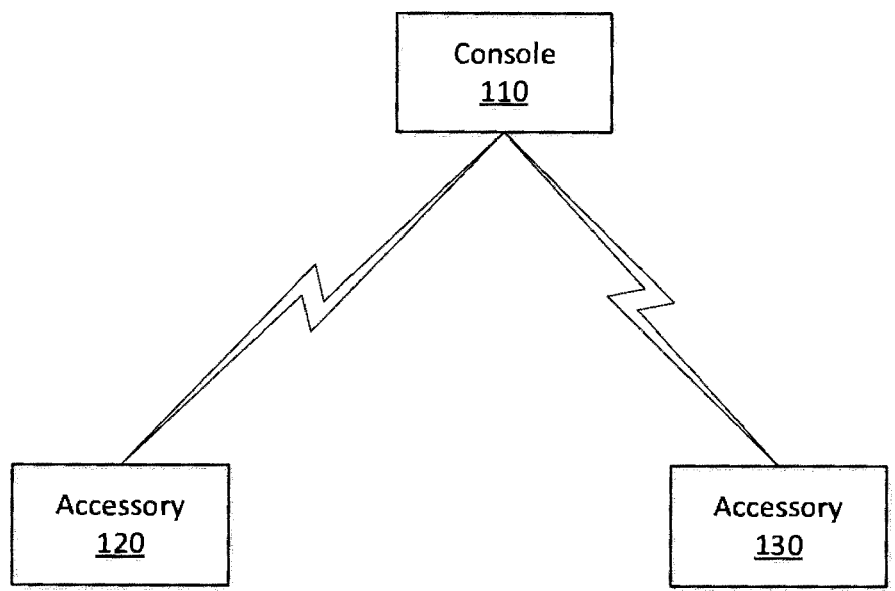
FIG. 1 illustrates an example wireless gaming environment.

FIG. 1 illustrates a wireless gaming environment in which a console 110 functions as an access point (AP) for a wireless network. The gaming environment includes an accessory 120 that functions as a client in the wireless network. The gaming environment also includes an accessory 130 that functions as a client in the wireless network. Accessory 120 and accessory 130 communicate in the wireless network using AP 110. In one embodiment, accessory 120 and accessory 130 do not communicate with each other. While two accessories are illustrated, a greater or lesser number of accessories may be present in a wireless gaming environment. Thus, the wireless gaming environment may include a varying number of simultaneously attached devices that can be added or removed during operation. While a console 110 and accessory 120 are illustrated, similar AP/client scenarios may exist for other apparatus including, but not limited to, televisions and accessories, personal computers, laptops, tablets, phones, or other devices. Additionally, in some examples, a computer, laptop, tablet or phone may function as a game console or may function as a controller. Thus, although example apparatus and methods are described herein in the context of a game console and accessory, the example apparatus and methods may apply more generally to an AP/client environment.

In one embodiment, accessory 120 has one radio that is configured to communicate with the console 110. In one embodiment, the console 110 may have two radios: one configured to communicate with the accessory 110 or other accessories, and one configured to communicate with other networks. The radio in accessory 120 may be configured to quickly find a specific console with which it wants to connect. The radios may be configured to selectively operate on different frequency bands at different modulation rates with different encryption using dynamic frequency selection.

In different embodiments, the accessory 120 may be, for example, a simple game controller used just for gameplay, a controller with a chat functionality, a controller with a stereo functionality, a controller with a display, a chat only device, a stereo only device, speakers, a remote control, or other device.

In one embodiment, contention can be reduced by reducing the likelihood that two or more devices will try to use the communication medium at the same time. The likelihood may be reduced through de-synchronization produced through distributed time division media access (TDMA). In one embodiment, the TDMA may include controlling clients to determine when they should sleep and when they should wake up so that clients that might contend for the same medium may wake up and sleep at different times and thereby become desynchronized. This approach may rely on the fact that in a CSMA/CA approach, there may only be a single frame in the network at a time. Clients are configured to sense when the media is being used and to avoid collisions. The carrier sensing, contention winning, and single frame approach facilitate de-synchronizing accessories through distributed TDMA. In one example, TDMA may be centralized and controlled by an AP. In another example, the TDMA may be distributed or decentralized with the clients being responsible for determining their time slots.

In one embodiment, after a client has won a contention, and after the client has recognized a successful completion of its communication with the console, the client may schedule its own sleep time and subsequent wakeup time. The successful completion may be associated with, for example, receiving an acknowledgement (ACK) message from the AP. Since only one client will win a contention at a time, and thus since only that client will see its successful ACK, that client may schedule a unique time to wake up, which may in turn reduce the likelihood that another client will be seeking to acquire the medium at the same time that the client wakes up. After a period of operation, clients may become desynchronized to the point where contention is reduced. De-synchronization may be enhanced by selectively controlling clients to have different properties (e.g., sleep times, back-off times, back-off interval progression). For example, a client may initially be configured to sleep at a time T for a duration of delta Δ. The Δ may be, for example, a multiple of 4 ms. Over time, to enhance de-synchronization, a client may have its Δ changed to, for example, multiples of 8 ms. The distributed TDMA includes the clients scheduling their own sleep/wakeup times rather than having sleep/wakeup controlled by the AP or other central controlling agent. Rather than adhering to centrally determined and inflexible slots, the clients determine their own slots. The client determined slots may, over time, desynchronize to the point where there is less overlap between slots. Reducing overlap reduces the likelihood that accessories will contend for the medium and thus reduces latency and power consumption.

In one embodiment, collisions can be reduced by reducing the number of messages passed between the AP and a client. Rather than passing separate pieces of information in individual communications (e.g., frames, packets, messages), each of which requires winning a contention and performing a handshake, example methods and apparatus may pass multiple pieces of information in a set of contiguous or uninterrupted communications, where the entire set may be passed after a single contention and handshake. For example, when a client wins a contention, the AP may send multiple packets to the client rather than sending just a single packet. In one embodiment, the AP may send all the packets that are pending for a client that are scheduled for delivery within a defined time period. In one embodiment, the AP may even send all packets that are pending for a client to the client during the single communication period after the client wins the contention. Additionally, the client may send multiple packets to the AP rather than sending just a single packet. In one embodiment, the client may even send all packets that are pending for the AP to the AP during the single communication period after the client wins the contention. Draining the AP or client by sending multiple packets may reduce the number of times the client needs to contend for the medium thereby reducing contention.

In one embodiment, collisions can be reduced and power consumption can be reduced by reducing the number of handshaking messages passed between the AP and a client after a contention has been won. A conventional approach may involve a four message "two way" handshake. Example methods and apparatus may engage in a three message "one-and-a-half-way" handshake where, for example, data can serve as both data and as a handshaking acknowledgement. In one embodiment, data may serve as an ACK. In another embodiment, data may be coupled to an ACK and sent after the ACK without a conventional contention delay or additional round of message exchanges, or with a smaller contention delay.

Once a client has won a contention, the client may be allocated a reserved period of time for communicating with the AP. This may allow the AP enough time to access information for the client, to prepare the information for communication to the client, and then to send the information to the client during the reserved period of time rather than forcing the AP to engage in and win another contention. This time consumed by the AP may be referred to as "turnaround delay". In one embodiment, the reserved period of time may be controlled using the network allocation vector (NAV) function of a wireless protocol (e.g., 802.11). The NAV function facilitates a client reserving a shared medium for a period of time that exceeds the console turnaround time. By reserving a period of time, only the trigger packet may be forced to contend for the medium, subsequent packets or frames in the exchange may not need to contend.

Recall that carrier sense includes two separate functions. NAV is virtual carrier sense that is used to reserve the medium. Clear channel assessment (CCA) is a physical carrier sense that listens to energy received on the radio interface. CCA indicates a busy medium. NAV reserves the medium as busy.

In one embodiment, contention and collisions may also be reduced by more wisely selecting the network or communication channel over which a client and AP will communicate. For example, two communication channels may be available for a communication. A first communication channel may be experiencing a first (e.g., higher) level of traffic while a second communication channel may be experiencing a second (e.g., lower) level of traffic. Rather than blindly connecting to the first available channel, example methods and apparatus may analyze network or channel information to determine an appropriate channel to use for communication. In one embodiment, methods and apparatus may monitor channel utilization and provide channel utilization information in, for example, a beacon message associated with a wireless protocol. By way of illustration, a wireless protocol may involve an AP periodically sending a broadcast message (e.g., beacon). In one embodiment, channel utilization information may be provided in the broadcast message and clients may select a communication channel based, at least in part, on the channel utilization information.

Utilization concerns how busy a network is. Utilization may be measured, for example, based on the amount of air time being consumed by traffic. Air time consumption can be measured, for example, by the AP, or by individual clients. In one embodiment, the AP may track air time usage and report that air time usage in the beacon message. In another embodiment, the individual clients may monitor air time usage and provide this usage information to the AP. The AP may then aggregate client information and provide the aggregate information or information derived from the aggregate information in the beacon message.

In one embodiment, a radio in an accessory may measure the average time from the beginning of a trigger packet of a burst from a connected device to the end of the last ACK packet at the end of the burst. The average time may be computed from a plurality of burst transaction measurements. The average may be normalized by the burst duty cycle time. In one embodiment, the utilization may be measured independently for connected accessories. In one embodiment, the average utilization from different accessories may be combined to produce the overall channel utilization metric.

The capacity or utilization information may be provided in a beacon packet. In one embodiment, the beacon packet may be transmitted periodically (e.g., once every 100 ms). In one embodiment, a console radio may issue a message (e.g., probe request) to query another console to provide its capacity or utilization data. The capacity or utilization data may be returned, for example, in a probe response.

In a shared wireless gaming environment, there may be multiple APs (e.g., consoles) and multiple clients (e.g., game controllers, accessories). Consider a college dormitory where a hundred students may have their own gaming consoles and may be participating in a massively online game. Players may come and go throughout a period of time. Example methods and apparatus may selectively connect clients to different channels or networks based, at least in part, on the air time usage reported in the beacon messages. While air time usage is described, the beacon message or other broadcast message may contain information or statistics derived from air time usage or other network utilization measurements.

In one embodiment, battery life may be extended by selectively controlling how frequently a client communicates with an AP. Recall that clients may initiate communications with the AP. The client may interrogate the AP to determine whether the AP has any messages to send to the client. Conventionally, the clients may have initiated communications at a fixed interval, even if the client had nothing to communicate and even if the client had intelligence that it was likely that the AP would have nothing to send to the client. In one embodiment, methods and apparatus may control a client to selectively reduce how frequently the client initiates communications with the AP. For example, when a client doesn't have any data for the AP, or when a client doesn't have any data and is unlikely to have any data for the AP, then the client may reduce how often it initiates communications with the AP. Similarly, when a client knows that it is unlikely that the AP will have any data for the client, then the client may reduce how often it interrogates the AP for data. For example, a client may switch from sending an initiation message once every 40 ms to once every 80 ms then once every 160 ms and for even longer periods of time. Different intervals and different changes in intervals may be employed.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 2:
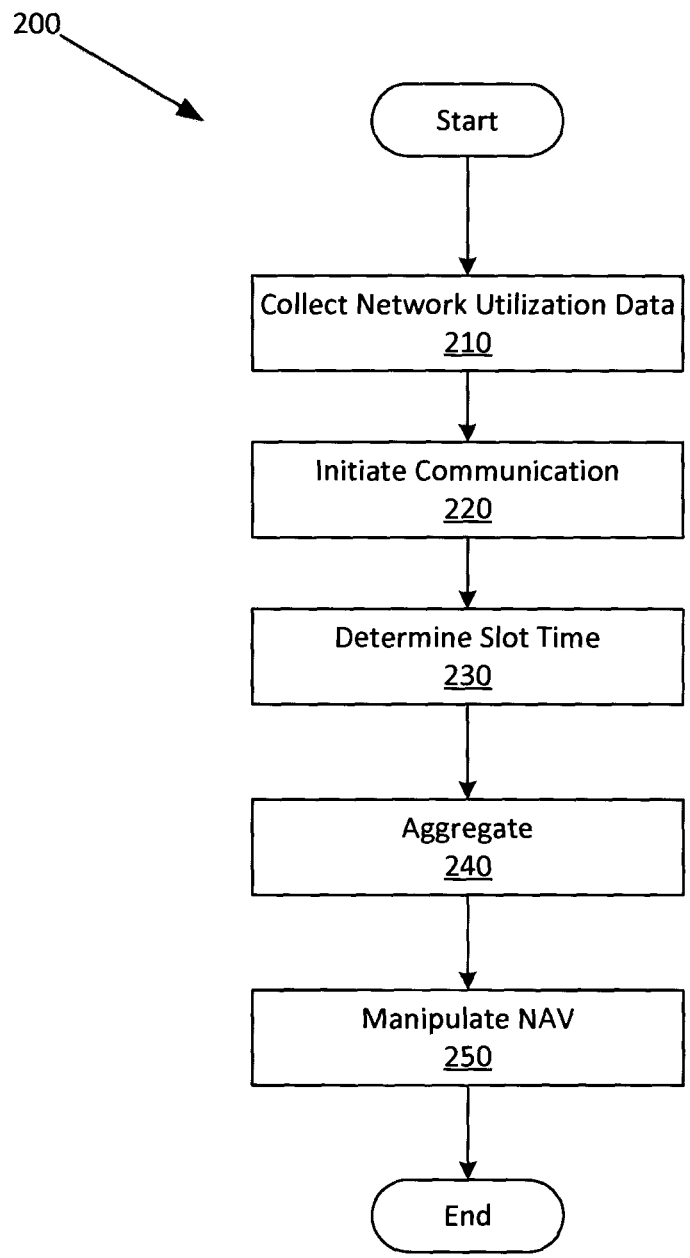
FIG. 2 illustrates an example method associated with a wireless gaming protocol.

FIG. 2 illustrates an example method 200 associated with a wireless gaming protocol. In different examples, method 200 may be performed on a single device, may be performed partially or completely in the cloud, may be performed on distributed co-operating devices, or may be performed other ways. In different examples, method 200 may be performed on devices including, but not limited to, a computer, a laptop computer, a tablet computer, a phone, a smart phone, a game console, or a game accessory.

Method 200 includes, at 210 collecting network utilization data associated with a wireless network employed in the wireless gaming environment. In the wireless network a gaming console may function as an AP and a gaming accessory (e.g., controller, paddle) may function as a client. Once the network utilization data has been collected, method 200 may selectively control various actions as a function of the network utilization data. For example, method 200 may control a communication priority for the client, a network selection by the client, a channel selection by the client, a sleep time for the client, or a wakeup time for the client. Additional or alternative actions may be controlled as a function of the network utilization data.

In different embodiments, the network utilization data may be collected at the AP or may be collected at the client(s) and provided by the client(s) to the AP. Once the network utilization data has been collected, method 200 may include computing network utilization information from the network utilization data. In one embodiment, the network utilization information may be computed as a function of the amount of air time used by the AP or the amount of air time used by the client.

In one embodiment, method 200 may include controlling the AP to provide the network utilization data to other nodes or entities in the wireless network. For example, the AP may transmit a beacon message that provides the network utilization data or the network utilization information.

Method 200 also includes, at 220, controlling how communications are initiated between the client and the AP. In one embodiment, communications between the client and the AP may only be initiated by the client. In one embodiment, the client may initiate a communication with the AP by sending a trigger packet. The trigger packet may be, for example, a single trigger or a trigger associated with a burst. Conditions may change over time, therefore, in one embodiment method 200 may include selectively controlling the client to modify how often the client will send trigger packets to the AP. For example, the client may send trigger packets more frequently when more busy and less frequently when less busy.

Method 200 also includes, at 230, controlling the client to determine a slot time according to a distributed time division media access (TDMA) approach. A slot time refers to a period of time during which a client will be awake and may attempt to acquire the medium in the wireless network. In one embodiment, method 200 relies on a distributed TDMA approach where the client determines a next slot time for the client as a function of the completion time of a successful transmission from the client to the AP. In another embodiment, method 200 relies on a distributed TDMA approach where the client determines a next slot time for the client as a function of an access identifier associated with the client. Slot times may be computed in different ways at different times. For example, method 200 may have clients compute slot times using a first approach at a first time and then using a second approach at a second time. Conventionally, media access control associated with slot times may have eliminated the need for contention. However, in a dynamic wireless gaming environment, where accessories may be added and removed, and where slot times are being computed at the accessories, a combination of slot times and trigger packet contention may be employed.

Method 200 also includes, at 240, controlling exchanges between the client and the AP to employ packet aggregation. Packet aggregation may involve sending more than a single message or frame at a time from the client to the AP or from the AP to the client. In one embodiment, aggregation may result in the AP providing two or more downstream packets that are ready to send to the client in response to a single trigger packet from the client. The downstream packets will be sent as part of a single exchange between the AP and the client after a contention win by the client. Only the trigger packet may have to contend for the channel. In one embodiment, aggregation may result in the client providing two or more upstream packets that are ready to send to the AP in response to receiving a downstream packet from the AP. Once again, the upstream packets will be sent as part of a single exchange between the AP and the client after the contention win by the client.

In one embodiment, either an AP or a client may have multiple frame queues available for queuing frames to be transmitted. Thus, in one embodiment, the two or more downstream packets are provided from one of a plurality of frame queues in the AP. When multiple frame queues are available, example apparatus and methods may pick the packet(s) having the earliest deadline across the queues. Members of the plurality of frame queues may have different communication timing parameters. Having different communication parameters may facilitate providing the downstream packets as quickly as possible given the current operating conditions on the wireless network.

Aggregation may also involve controlling the AP to provide a data frame as an acknowledgement to a trigger packet. This facilitates reducing the number of messages exchanged. Aggregation may also involve controlling the AP to provide a data frame within a threshold time of providing an acknowledgement to a trigger packet. The threshold time may be selected to prevent a second client from winning a contention in the wireless network.

While discussing aggregation, different types of packets have been introduced. For example, trigger packets, ACK, and data packets have been introduced. In one embodiment, a wireless gaming protocol may support different types of data that are characterized by, for example, bandwidth requirements, latency requirements, reliability requirements, and other parameters. For example, a wireless gaming protocol may define controller data, command data, audio data, media data, or other types of data. Controller data may be used, for example, to send state information from the client to the AP and to send game information from the AP to the client. Command data may be used to send control and management information to or from the client. Audio data may be bi-directional and media data may be upstream or downstream data.

Method 200 also includes, at 250, controlling the client to manipulate media access control for the wireless network using a network allocation vector (NAV). In one embodiment, the NAV may be configured as a function of a turnaround delay associated with the AP. In one embodiment, the client may manipulate media access control by setting the NAV to a value that exceeds the AP turnaround delay. Since the longer NAV may produce a condition where a recently awaked client may have missed the NAV, method 200 may also include controlling the client, upon waking up, to sense the medium employed in the wireless network for a period of time exceeding the turnaround delay before beginning a contention.

Figure 3:
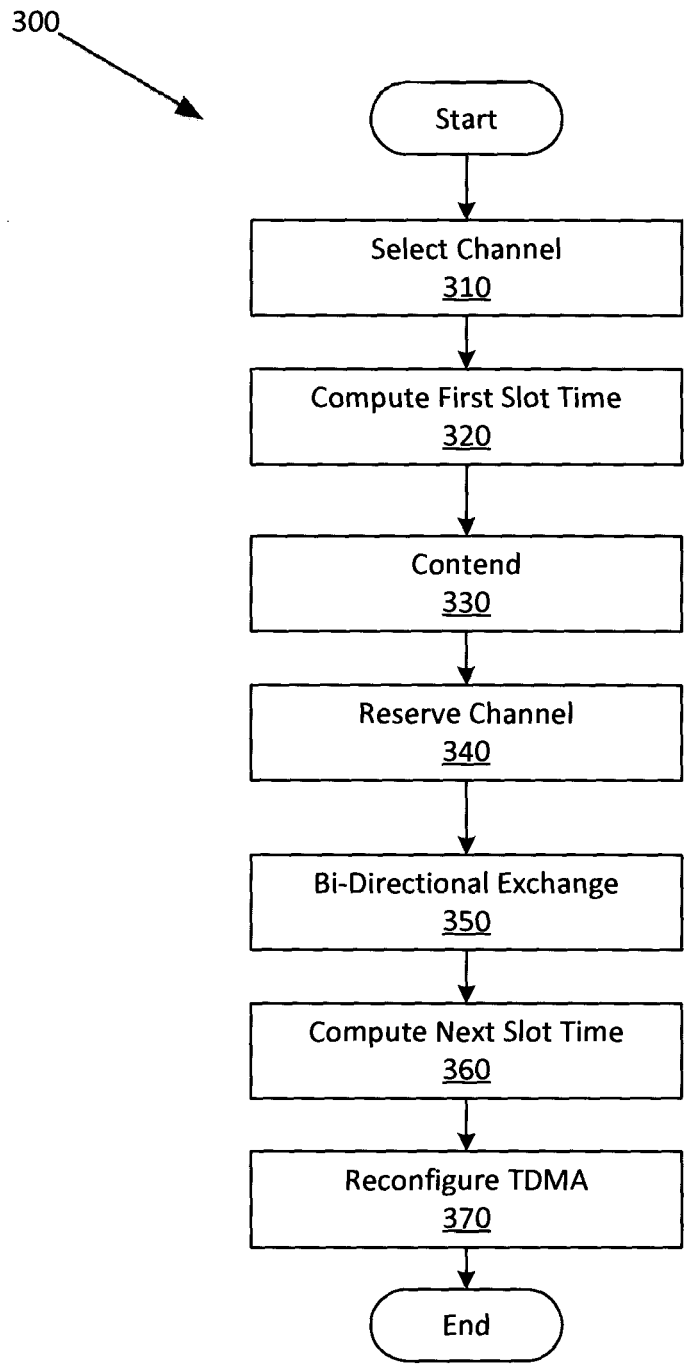
FIG. 3 illustrates an example method associated with a wireless gaming protocol.

FIG. 3 illustrates an example method 300 associated with a wireless gaming protocol. Method 300 is configured to reduce latency in a wireless network used by a shared, wireless gaming system. The wireless network may include an AP (e.g., console) and a client (e.g., accessory). Method 300 includes, at 310, selecting a channel to be used by the client to access the wireless network. Which channel is selected may be based, at least in part, on channel utilization data collected from nodes in the wireless network and made available by the AP.

Method 300 also includes, at 320, computing a first slot time for the client according to a distributed time division media access (TDMA) protocol. With the first slot time computed, the client is now ready to contend for the medium associated with the selected channel when the first slot time arrives. Upon determining that the first slot time is active, method 300 includes, at 330, having the client engage in a contention to acquire the channel. A trigger packet may then contend for the channel. In one embodiment, if the trigger packet is contending for the channel and does not gain access within, for example, one-half of the frame time (e.g., 4 ms), the trigger packet will be abandoned.

Upon determining that the contention has been completed successfully, the client may then be ready to reserve the channel and to communicate. Therefore, method 300 proceeds, at 340, to manipulate a network allocation vector (NAV) to reserve the channel for a period of time sufficient to support an uninterrupted bi-directional exchange between the client and the AP. With the channel reserved, method 300 then proceeds, at 350, to initiate the bi-directional exchange from the client to the AP. The exchange may be initiated by providing a trigger packet from the client to the AP. The bi-directional exchange may include receiving zero or more downstream packets into the client from the AP and providing zero or more upstream packets from the client to the AP.

Once the bi-directional exchange has been successfully completed, and once the client has determined that the bi-directional exchange has been successful, the client may then, at 360, compute a next slot time for the client. In one embodiment, the start of the next slot time may be based, at least in part, on when the packet is first successful at gaining the media to transmit. The client may then go to sleep until the next slot period.

Conditions in the wireless network or in the wireless networking environment may change over time. Therefore method 300 may include, at 370, selectively reconfiguring a TDMA parameter based, at least in part, on the channel utilization data. The TDMA parameter may be associated with, for example, timing, message sequencing, or other protocol related matters.

While FIGS. 2 and 3 illustrates various actions occurring in serial, it is to be appreciated that various actions illustrated in FIGS. 2 and 3 could occur substantially in parallel. By way of illustration, a first process could handle network utilization processing, a second process could handle message exchanges, a third process could compute slot times according to the distributed TDMA, and a fourth process could update protocol parameters. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 200 or 300. While executable instructions associated with the above methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, ROM, and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 4:
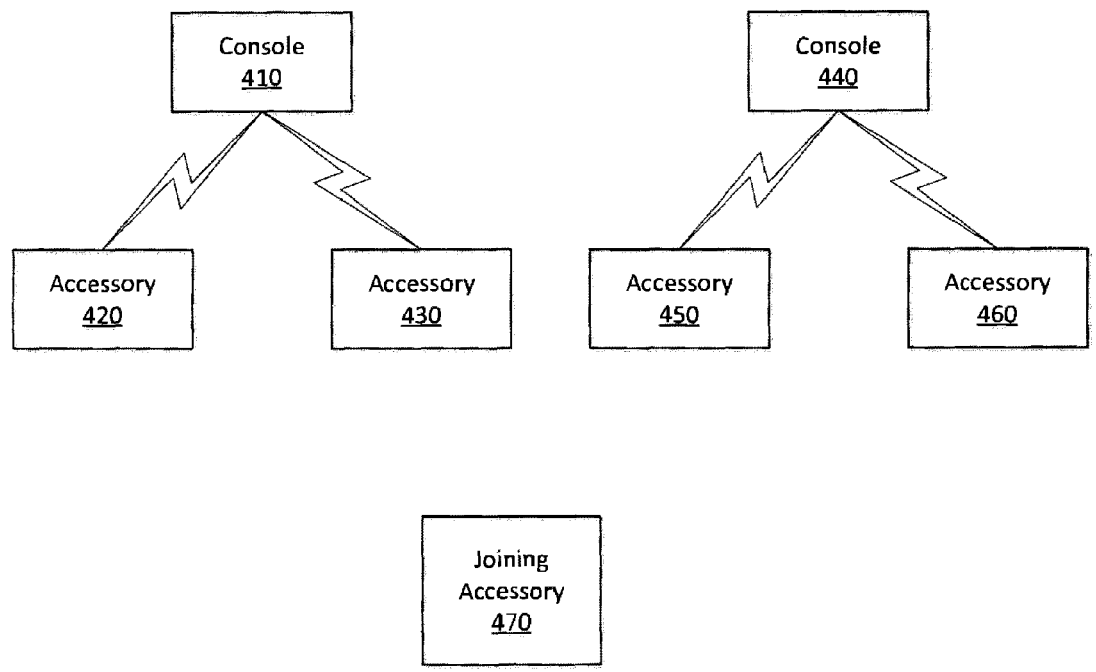
FIG. 4 illustrates an example wireless gaming environment.

FIG. 4 illustrates an example wireless gaming environment where a new accessory 470 is seeking to join a wireless network. There are two wireless networks available. A first network includes a console 410 functioning as an AP for a wireless network. Console 410 may be an AP for an accessory 420 that is functioning as a client and for an accessory 430 that is also functioning as a client. A second network includes a console 440 functioning as an AP in another wireless network. Console 440 may function as an AP for an accessory 450 that is functioning as a client and for an accessory 460 that is also functioning as a client. There may be different amounts of air time being used on the two different networks. The gaming experience of a user of accessory 470 may be profoundly influenced by which network is joined.

Figure 5:
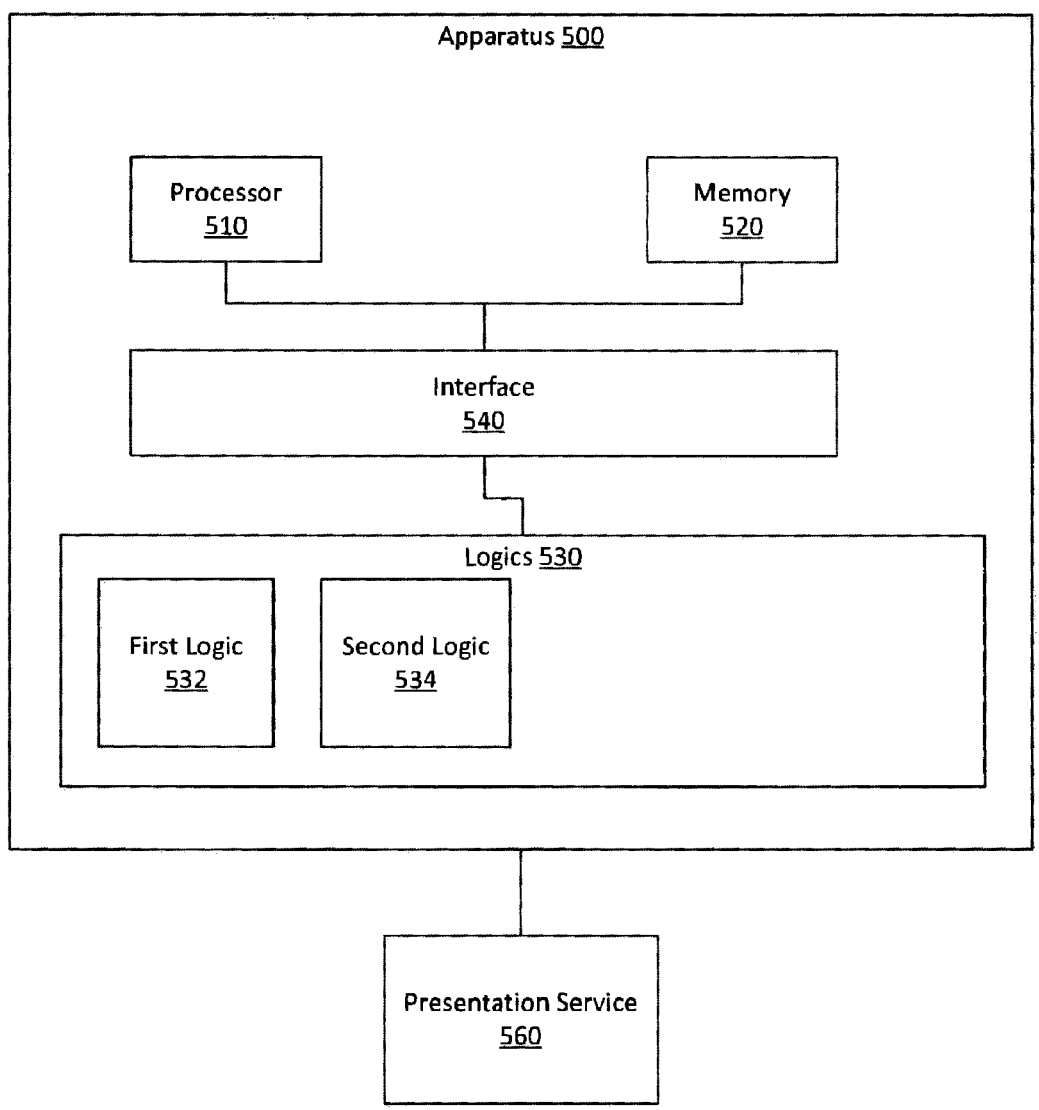
FIG. 5 illustrates an example apparatus configured to participate in a wireless gaming protocol.

FIG. 5 illustrates an apparatus 500 that includes a processor 510, a memory 520, a set 530 of logics, and an interface 540 that connects the processor 510, the memory 520, and the set 530 of logics. The set 530 of logics may be configured to implement timing and messaging associated with a wireless gaming protocol used by clients in a wireless network that participate in distributed time division media access (DTDMA). Apparatus 500 may be, for example, a computer, a laptop computer, a tablet computer, a personal electronic device, a smart phone, a system-on-a-chip (SoC), a game console, a game accessory, or other device that can access and process data.

In one embodiment, the apparatus 500 may be a general purpose computer that has been transformed into a special purpose computer through the inclusion of the set 530 of logics. Apparatus 500 may interact with other apparatus, processes, and services through, for example, a wireless network. Apparatus 500 may interact with the other apparatus in a shared, wireless gaming environment.

The set 530 of logics may include a first logic 532 that is configured to control timing for the wireless gaming protocol. In one embodiment, the first logic 532 may be configured to control timing by provisioning a network allocation vector (NAV) to reserve an access medium associated with the wireless network for a period of time sufficient to allow a bi-directional message exchange between the AP and the client over the medium. The bi-directional message exchange may include two or more aggregated upstream frames from the client to the AP or two or more aggregated downstream frames from the AP to the client. The bi-directional message exchange may be performed after a single contention win by the client.

In one embodiment, the first logic 532 may also be configured to control timing by controlling the client to schedule a next slot time for the client. The next slot time may be selected based, at least in part, on detecting a successful completion of a current message exchange during a current slot time employed by the client.

The set 530 of logics may also include a second logic 534 that is configured to control message exchange for the wireless gaming protocol. The second logic 534 may operate by restricting message exchange initiation to the client. This means that the clients can initiate exchanges with the console and that the console will not initiate exchanges with accessories. In one embodiment, the second logic 534 may be configured to control message exchange by controlling trigger messages and the responses to trigger messages. In one embodiment, the second logic 534 may control the client to generate, periodically, a client initiated trigger message. The AP may accept the client initiated trigger message and provide a downstream message available in the AP to the client in response to the client initiated trigger message. The second logic 534 may then control the client to provide an upstream message available in the client to the AP in response to receiving the downstream message.

In one embodiment, the second logic 534 may be configured to control message exchange by controlling how the AP acknowledges a trigger or data from the client. In one embodiment, the AP may provide a data frame configured to perform an acknowledgement function. In another embodiment, the AP may provide a data frame within a threshold amount of time of providing an acknowledgement frame. In either embodiment, the message exchange will remove one step from a conventional message exchange.

In different embodiments, some processing may be performed on the apparatus 500 and some processing may be performed by an external service or apparatus. Thus, in one embodiment, apparatus 500 may also include a communication circuit that is configured to communicate with an external source to facilitate controlling timing and message exchange. In one embodiment, the first logic 532 or the second logic 534 may interact with a presentation service 560 to facilitate displaying data using different presentations for different devices.

Figure 6:
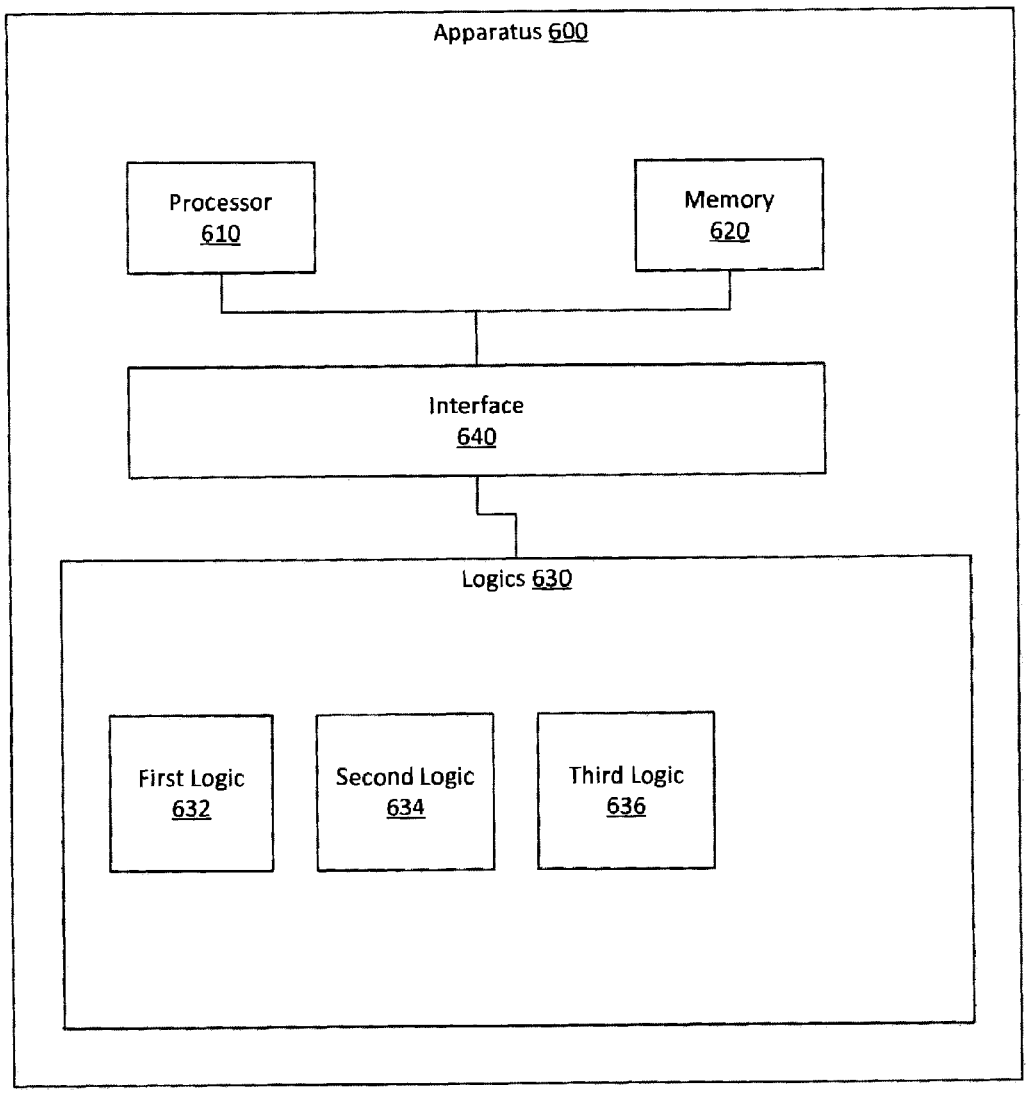
FIG. 6 illustrates an example apparatus configured to participate in a wireless gaming protocol.

FIG. 6 illustrates an apparatus 600 that is similar to apparatus 500 (FIG. 5). For example, apparatus 600 includes a processor 610, a memory 620, a set of logics 630 (e.g., 632, 634) that correspond to the set of logics 530 (FIG. 5) and an interface 640. However, apparatus 600 includes an additional third logic 636. The third logic 636 may be configured to monitor and report on air time usage. For example, the third logic 636 may be configured to acquire air time data from the AP or the client and then to compute medium utilization data from the air time data. Once the air time data is acquired and the medium utilization data is computed, the third logic 636 may control access to the wireless network based on the medium utilization information. Similarly, the third logic 636 may control a priority of the client on the wireless network based on the medium utilization information.

Air time data and network utilization data may provide information about traffic on a network. Decisions may then be made based on the degree to which the network is busy. Therefore, third logic 636 may also be configured to manipulate a timing parameter in the wireless gaming protocol or a message exchange parameter in the wireless gaming protocol based, at least in part, on the medium utilization data.

Figure 7:
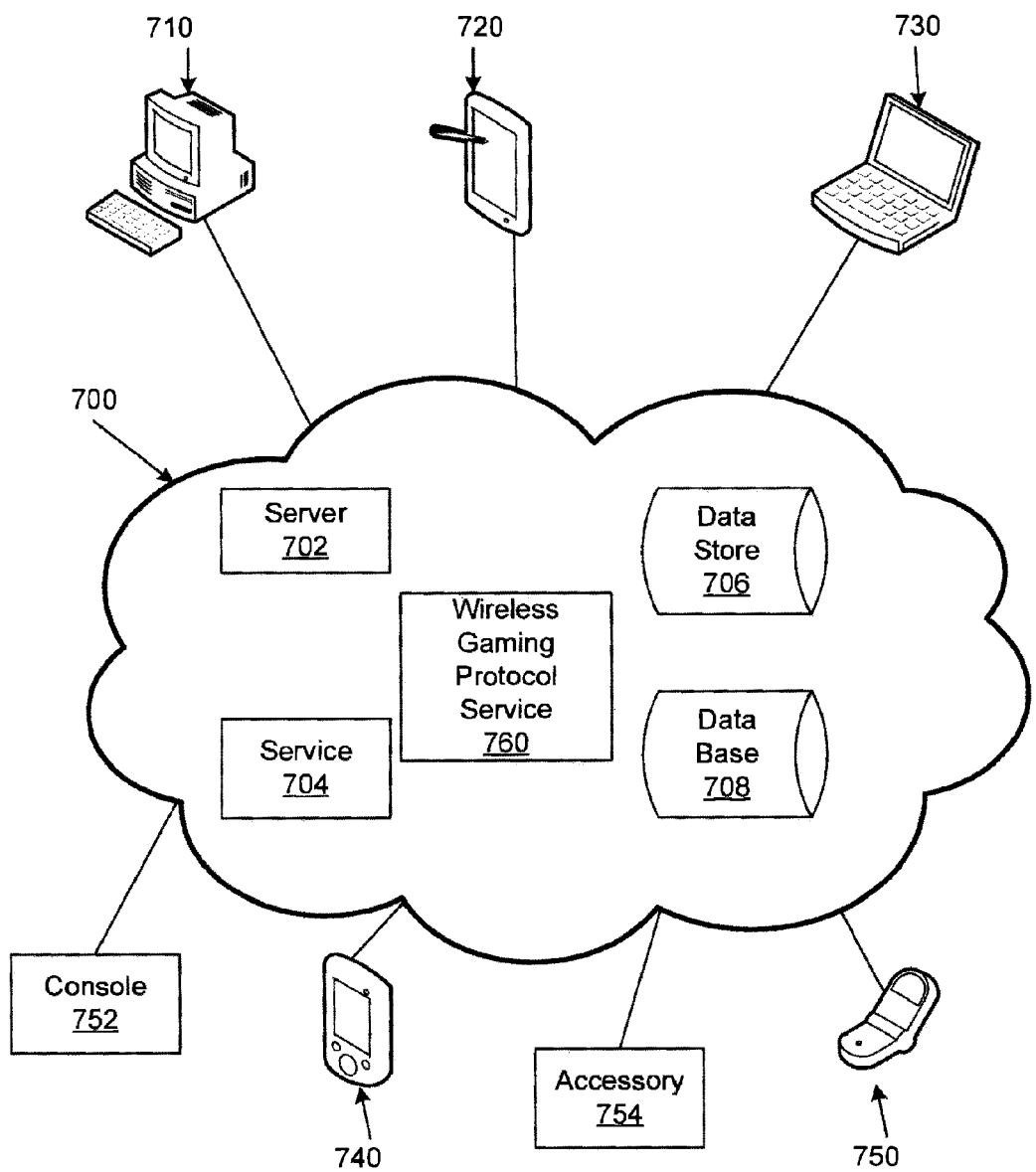
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example wireless gaming protocol service 760 residing in the cloud. The wireless gaming protocol service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the wireless gaming protocol service 760.

FIG. 7 illustrates various devices accessing the wireless gaming protocol service 760 in the cloud. The devices include a computer 710, a tablet 720, a laptop computer 730, a personal digital assistant 740, a mobile device (e.g., cellular phone, satellite phone, wearable computing device) 750, a game console 752, and a game accessory 754. The wireless gaming protocol service 760 may monitor and report on network utilization, may manipulate parameters in the wireless gaming protocol, or may perform other actions.

It is possible that different users at different locations using different devices may access the wireless gaming protocol service 760 through different networks or interfaces. In one example, the wireless gaming protocol service 760 may be accessed by a mobile device 750. In another example, portions of wireless gaming protocol service 760 may reside on a mobile device 750. Mobile device 750 may be used, for example, as a game console or as a game accessory. As a game console, mobile device 750 may be an AP in a wireless network. As a game accessory (e.g., handheld controller), mobile device 750 may be a client in a wireless network.

Figure 8:
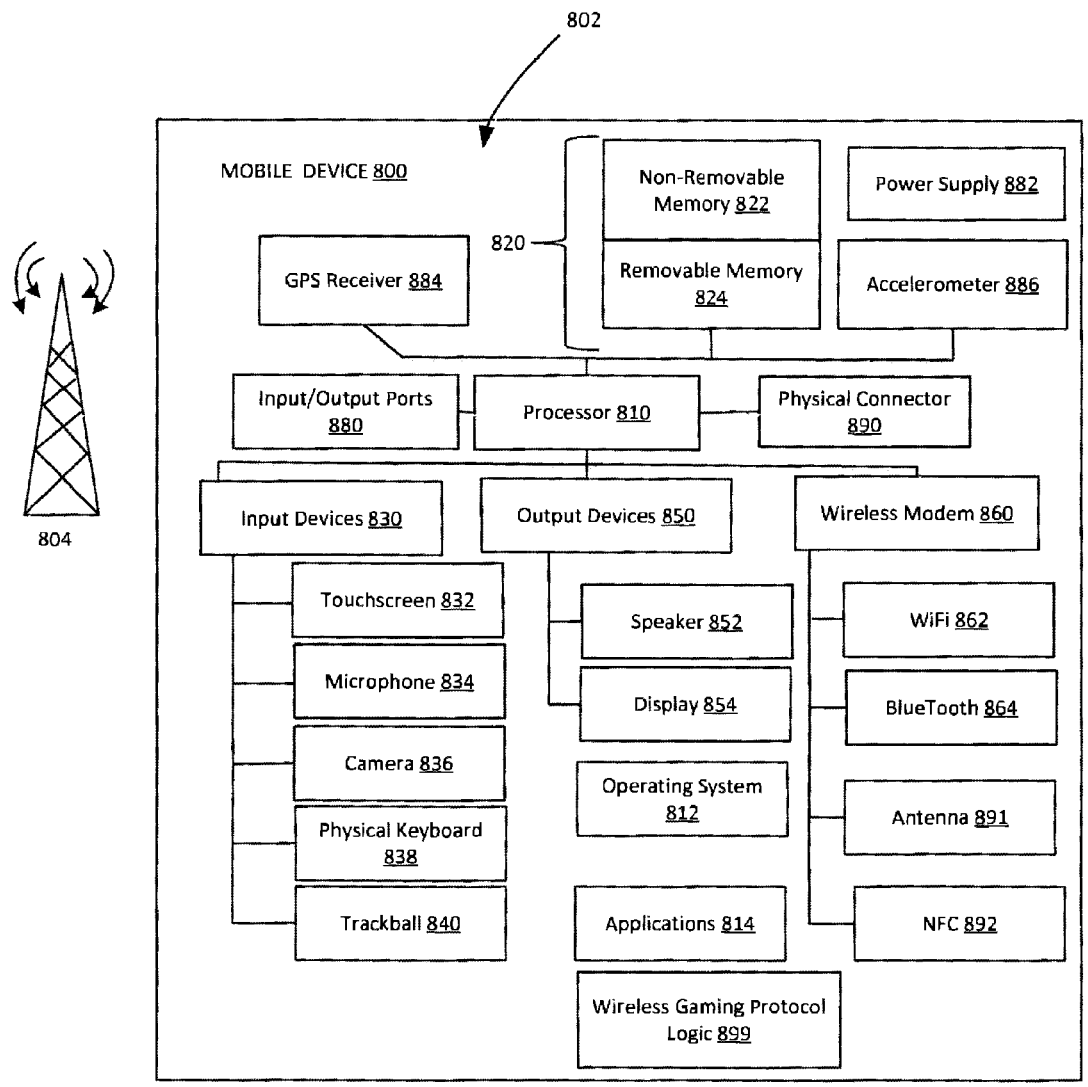
FIG. 8 is a system diagram depicting an exemplary mobile communication device configured to participate in a wireless gaming protocol.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, game console, game accessory, etc.) and may allow wireless two-way communications with one or more mobile communications networks 804, such as cellular or satellite networks. The mobile device 800 may function as a game console and play the role of an AP or may function as a game accessory and play the role of a client.

Mobile device 800 can include a controller or processor 810 (e.g., signal processor, microprocessor, application specific integrated circuit (ASIC), or other control and processing logic circuitry) for performing tasks including signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications, games), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include web pages, text, images, sound files, video data, or other data sets to be sent to or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). A NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC 892 facilitates having near field communications.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a wireless gaming protocol logic 899 that is configured to provide a functionality for the mobile device 800. For example, wireless gaming protocol logic 899 may provide a client for interacting with a service (e.g., service 760, FIG. 7). Portions of the example methods described herein may be performed by wireless gaming protocol logic 899. Similarly, wireless gaming protocol logic 899 may implement portions of apparatus described herein.

Example methods and apparatus concern establishing, maintaining, managing, or terminating a wireless connection between a radio in a gaming console and a radio in a gaming accessory. The accessory may be, for example, a handheld controller. The radio in the gaming console may operate as an AP in a wireless network. The radio in the accessory may operate as a client in the wireless network. Example methods and apparatus may establish, maintain, manage, or terminate the connection in accordance with a protocol. The protocol may define specific messages used in the protocol, including packet structures, packet definitions, or packet field definitions. The protocol may also define the sequences by which messages are exchanged.

FIGS. 9-16 illustrate one set of example message exchanges between a client and an AP. While FIGS. 9-16 illustrate one set of example message exchanges for a shared, wireless network gaming protocol, messages may be exchanged in other orders. Additionally, different messages than those illustrated may be exchanged.

Figure 9:
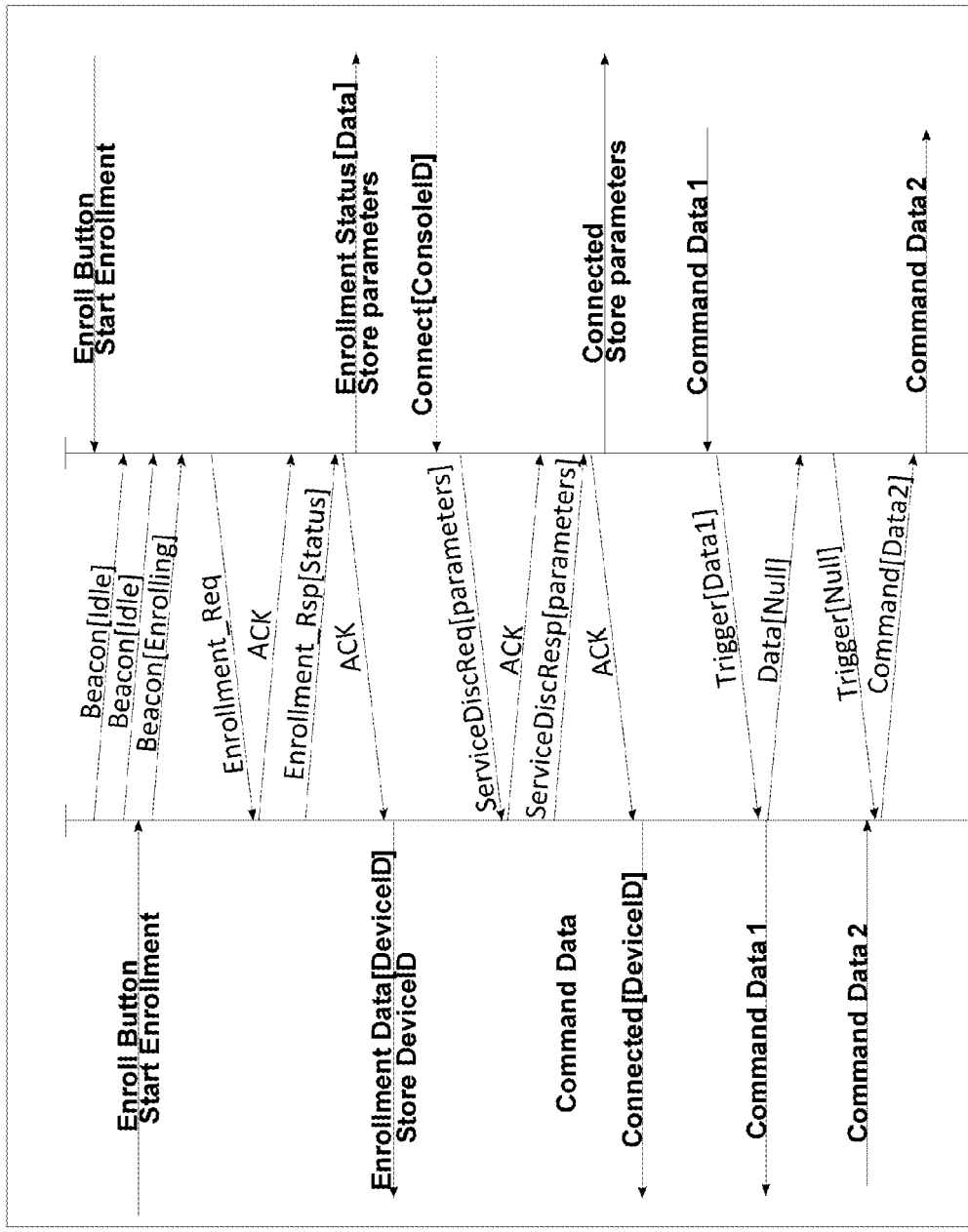
FIG. 9 illustrates an example enrollment message sequence associated with a shared, wireless gaming protocol.

FIG. 9 illustrates an example enrollment message sequence. Enrollment involves the exchange of information that determines, for example, a console identifier, an operating country, regional information, an operating channel list, a device identifier, or other information.

Figure 10:
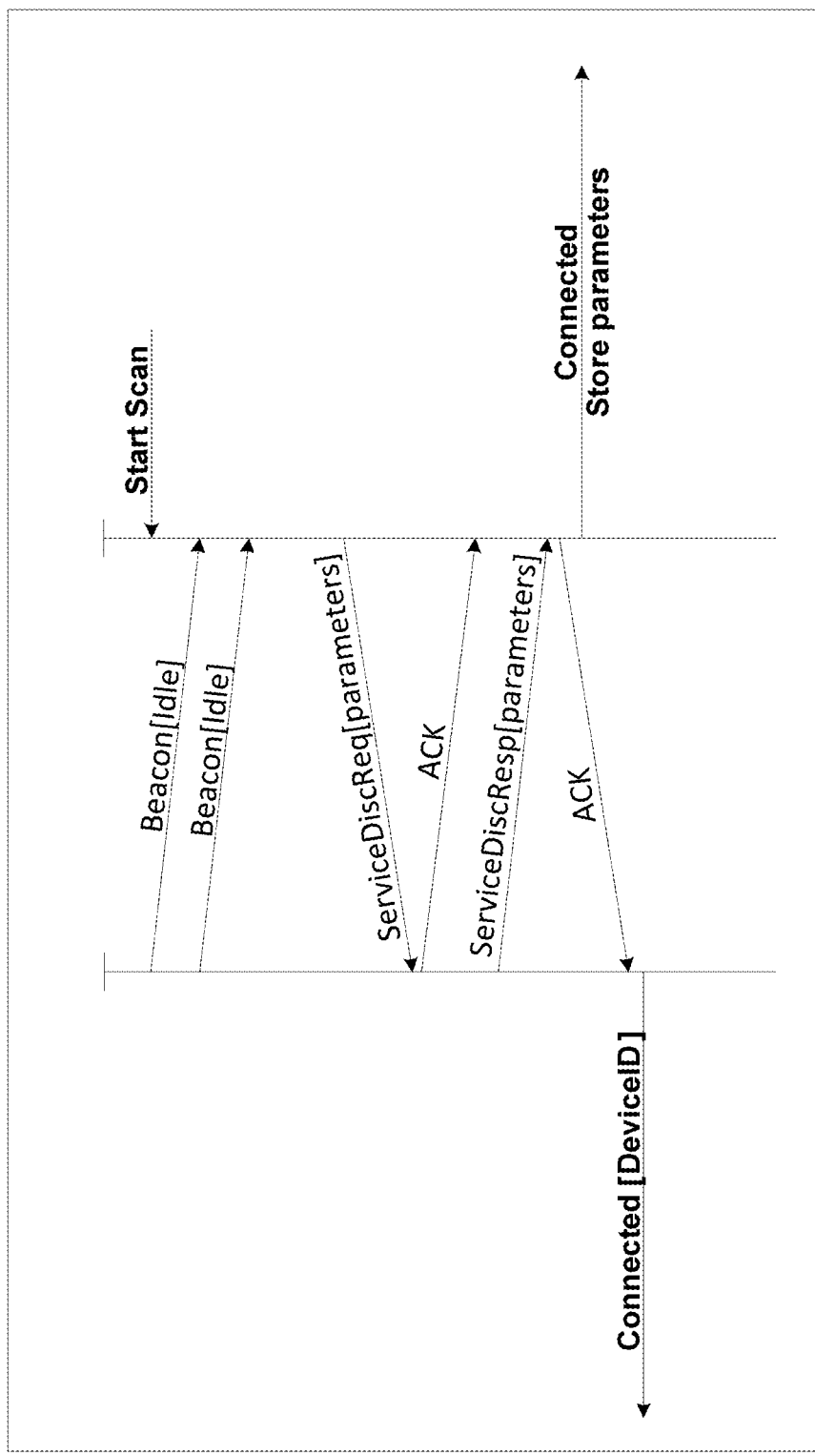
FIG. 10 illustrates an example service discovery message sequence associated with a shared, wireless gaming protocol.
Figure 11:
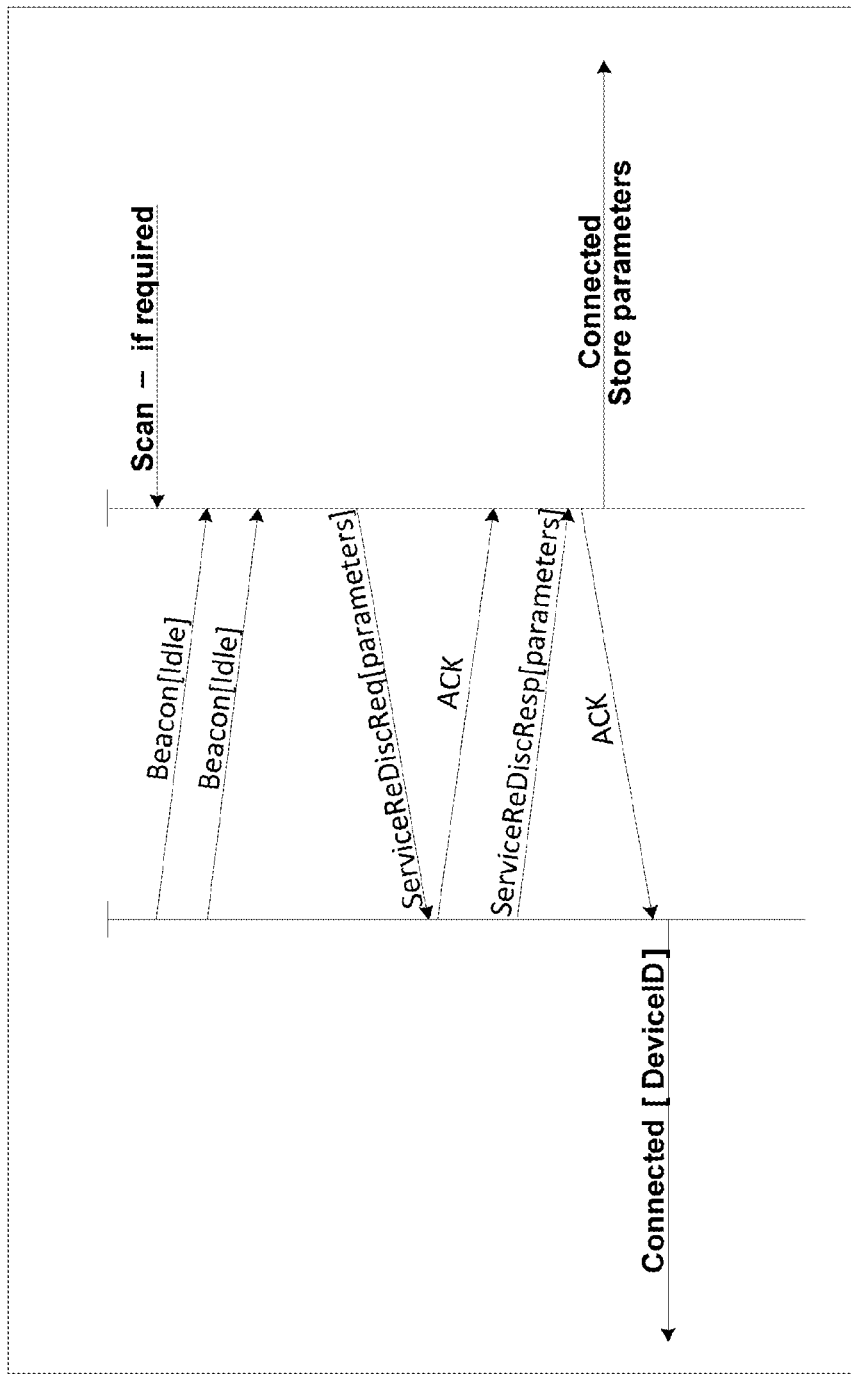
FIG. 11 illustrates an example service re-discovery message sequence associated with a shared, wireless gaming protocol.

FIG. 10 illustrates an example service discovery message sequence. FIG. 11 illustrates an example service re-discovery message sequence. Service (re)discovery is used to establish an active connection to a console.

Figure 12:
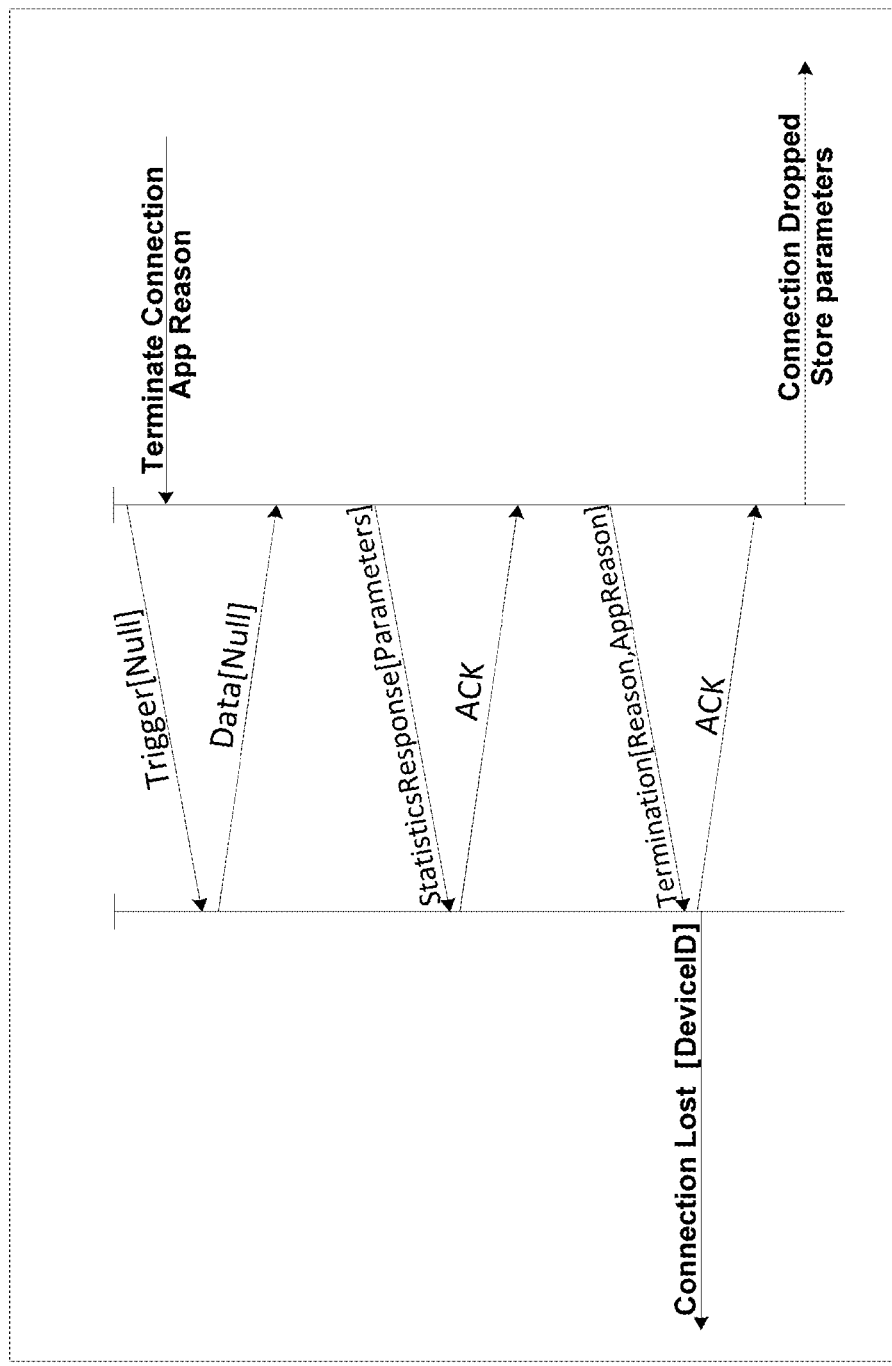
FIG. 12 illustrates an example device termination message sequence associated with a shared, wireless gaming protocol.
Figure 13:
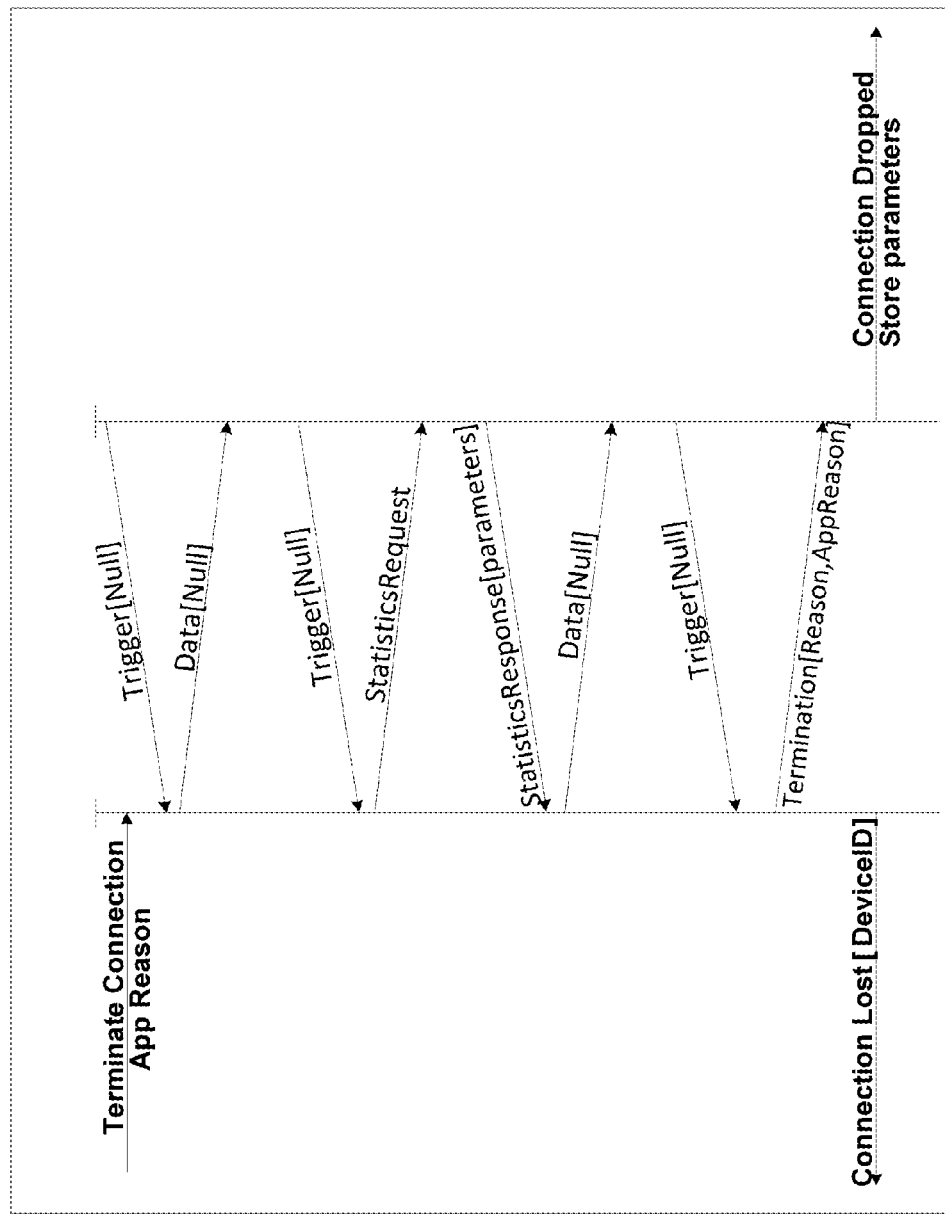
FIG. 13 illustrates an example console termination message sequence associated with a shared, wireless gaming protocol.
Figure 14:
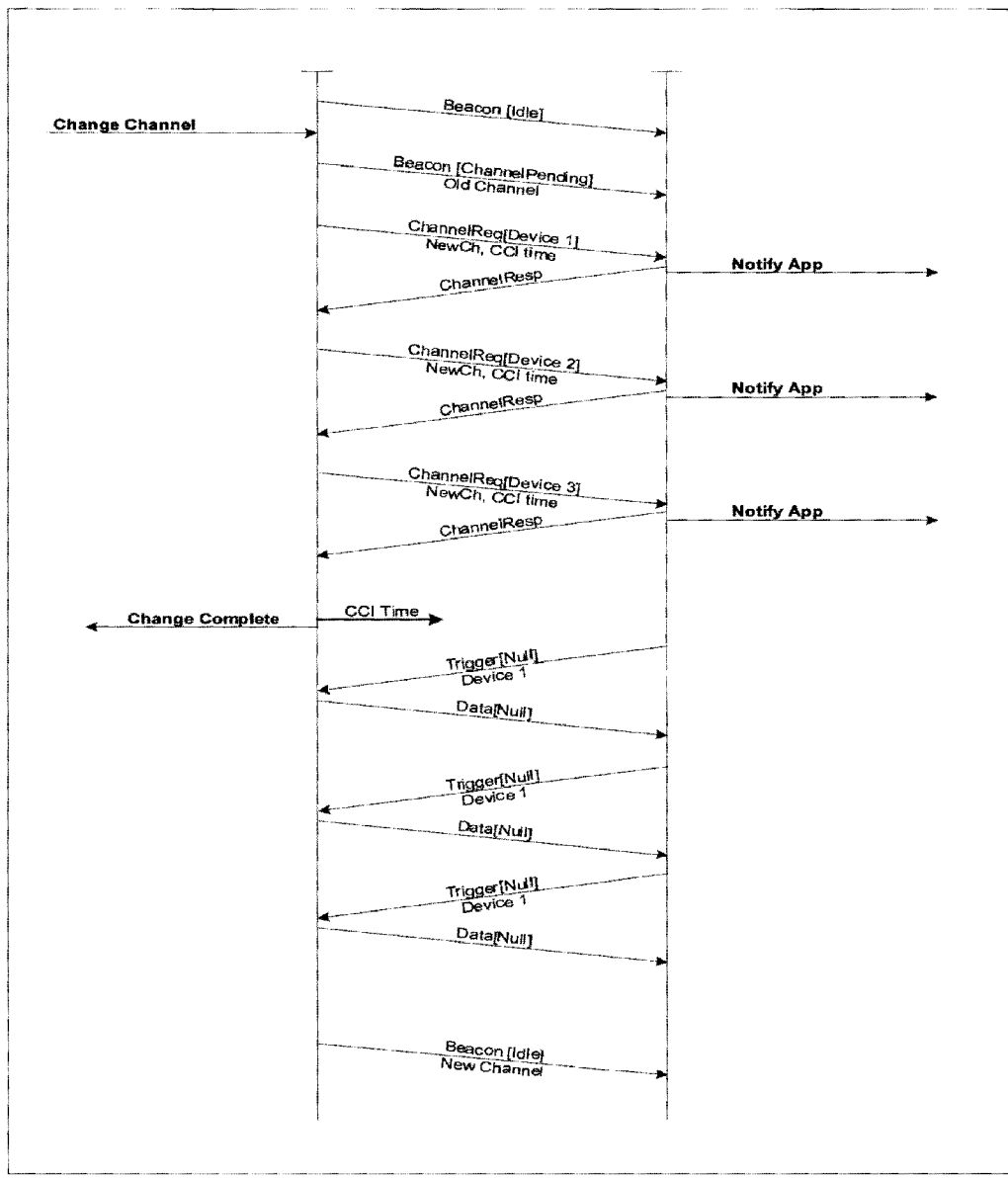
FIG. 14 illustrates an example channel change message sequence associated with a shared, wireless gaming protocol.
Figure 15:
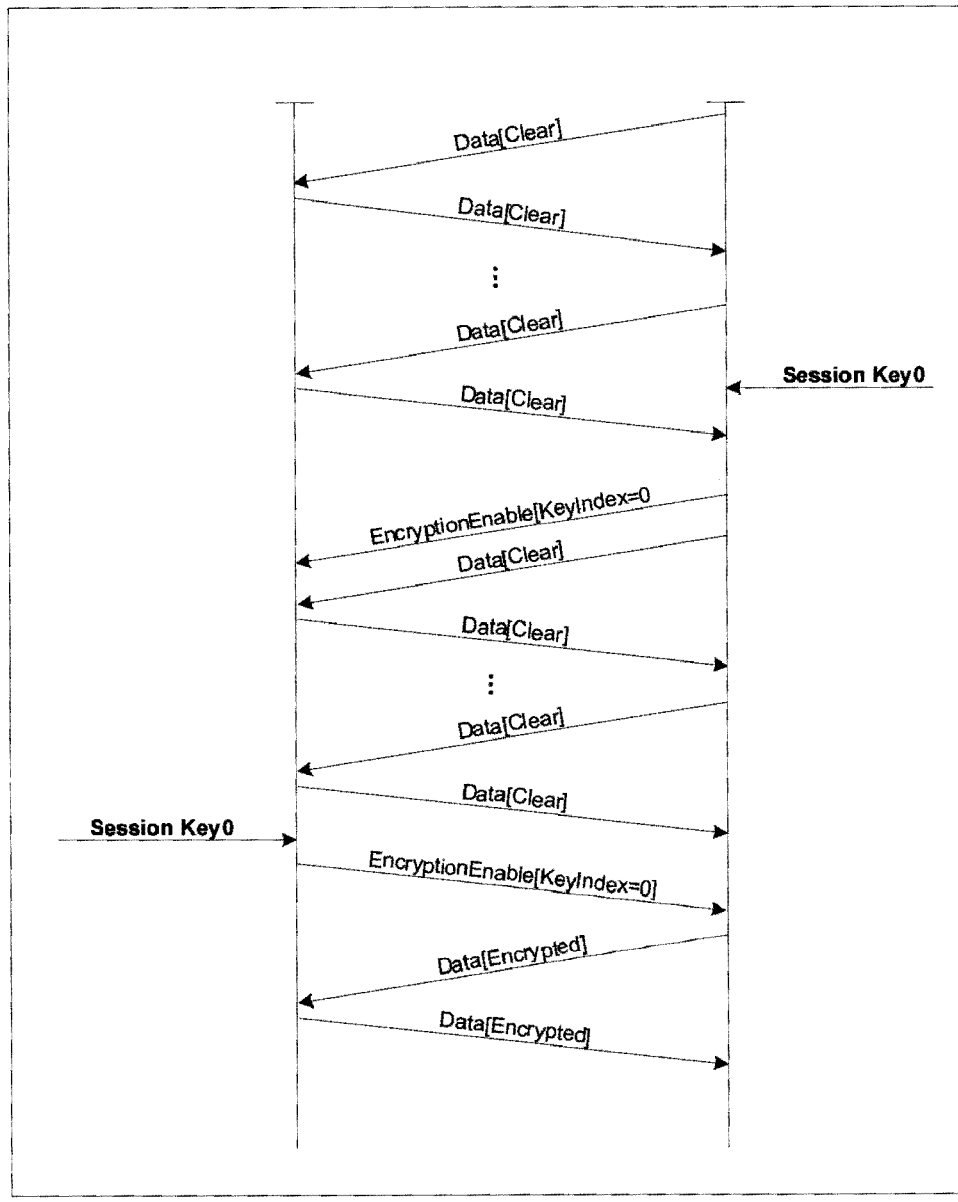
FIG. 15 illustrates an example encryption message sequence associated with a shared, wireless gaming protocol.
Figure 16:
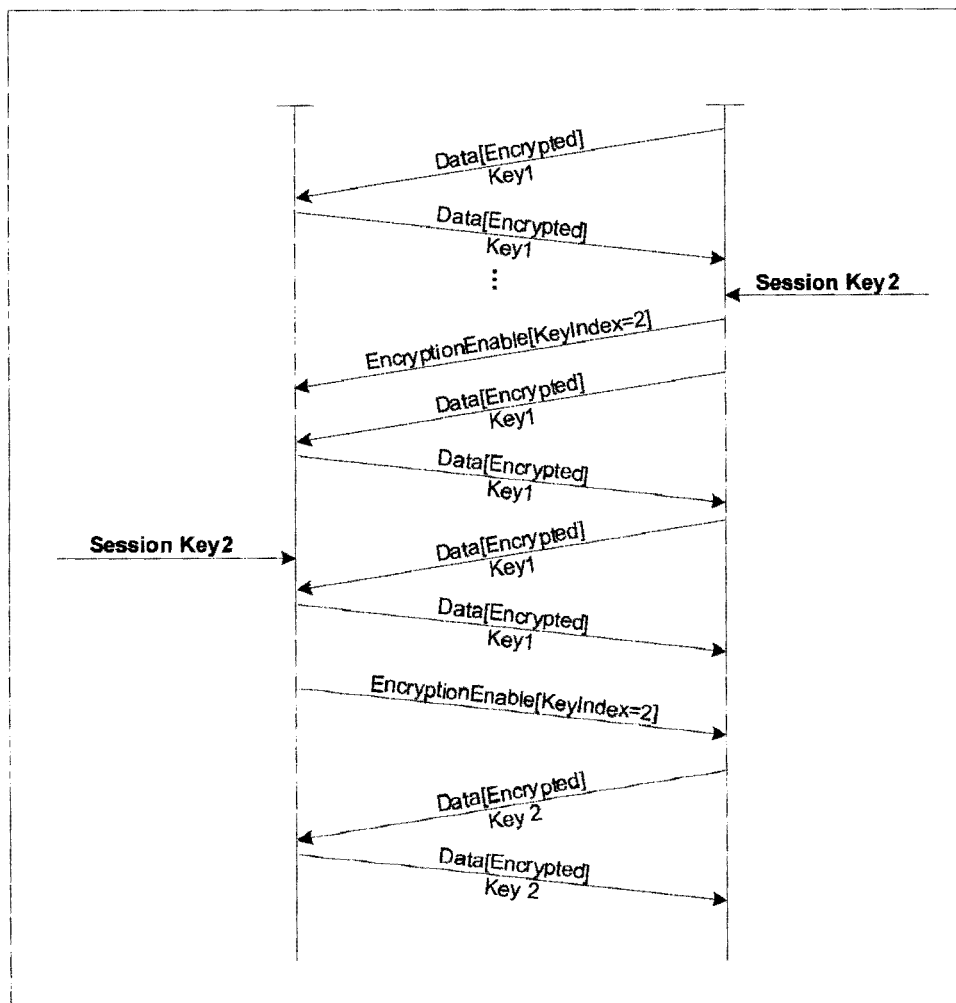
FIG. 16 illustrates an example message sequence associated with updating session keys in a shared, wireless gaming protocol.

FIG. 12 illustrates an example device termination message sequence. FIG. 13 illustrates an example console termination message sequence. FIG. 14 illustrates an example channel change message sequence. FIG. 15 illustrates an example encryption message sequence. FIG. 16 illustrates an example message sequence associated with updating session keys in a shared, wireless gaming environment. The message exchanges may be affected by different states in which radios may be. For example, a radio may be off, in standby, idle, connected, active, or in other states.

Figure 17:
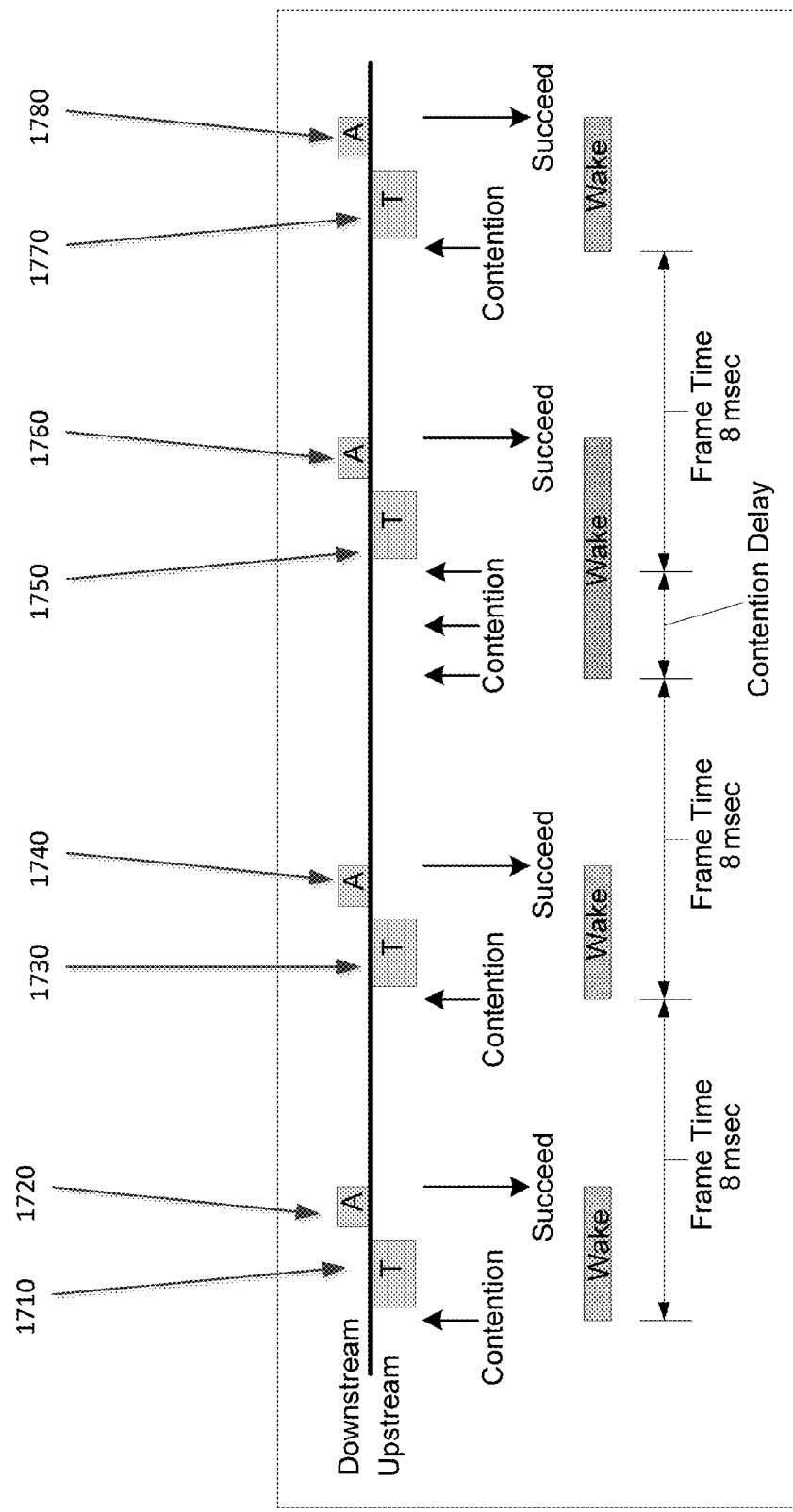
FIG. 17 illustrates timing associated with the de-synchronization of accessories through the creation of non-overlapping slots created through distributed TDMA.

FIG. 17 illustrates timing associated with the de-synchronization of clients through the creation of non-overlapping slot times produced by the operation of the distributed TDMA. After winning contention, a client may send a trigger 1710 upstream to the AP. The AP may then send an ACK 1720. The client will be awake during this time period. The client may then go to sleep upon seeing the ACK 1720. The client may wake up again at the start of its next slot time and send trigger 1730. Once again the AP may send an ACK 1740, after which the client may go back to sleep. Trigger 1710 and trigger 1730 were both sent after the client won a contention, which occurred very quickly after the client woke up. Trigger 1750 is also sent after the client wins a contention. However, trigger 1750 is sent after a contention delay that was longer than that experienced before sending triggers 1710 or 1730. Once again the AP may send an ACK 1760 after which the client will go to sleep after scheduling its next slot time. Another trigger 1770 is sent after the client wakes up. The AP sends an ACK 1780. The effect of contention is illustrated in the longer delay before sending trigger 1750. Example methods and apparatus seek to reduce contention and thus to reduce this delay to provide an improved game experience. Computing slot times using the distributed TDMA approach may reduce the number of devices contending at any given time and thus reduce the effects of contention overall. Different embodiments may use different trigger packets. In one example, if a client has no trigger packet, the client may send a null frame. In another example, if the client has multiple packets, the client may pick the packet having the highest priority (e.g., closest deadline) and use that highest priority packet as the trigger packet. Other approaches may be employed.

A TDMA scheme involves clients having different slot times that reduce or even minimize overlap. Example methods and apparatus employ a distributed TDMA that allows clients to determine their own slots without AP co-ordination. Having clients determine their own slot times may involve having clients independently determine their slot start times. In one embodiment, clients use the time of successful transmission of their last frame plus a deadline time as the start time for their next slot time. In one embodiment, clients may also compute the start time for their next slot time as a function of their association identifier. Using the association identifier may facilitate producing different starting times for different clients. Distributed TDMA that leads to client-generated start times and non-overlapping slot times may allow clients to sleep more since the clients may not need to stay awake to receive frames from the AP. Sleeping more may reduce power consumption.

In a non-multi-user multi-input multi-output (MU-MIMO) system, distributed TDMA leverages the laws of physics that dictate that only one transmission in a shared, wireless gaming environment can be active at a time. Given this fact, only one client in contention range may successfully transmit at a given instant. The client that transmitted successfully can, therefore, determine a hopefully unique start time for a subsequent, hopefully non-overlapping slot time as a function of the successful transmission time. Since slots may overlap, trigger packets may still contend. When clients that are collaborating in the distributed TDMA compute their next start times based on their own successful transmission times, de-synchronization can occur, which may reduce contention by producing unique start times and less overlapping slot times. When a new accessory or client joins the network, another period of de-synchronization may occur. During this period clients may once again contend with each other, but over time the de-synchronization may be re-established and contention may be reduced.

In another embodiment, slot times may be determined as a function of the association identifier (AID) for a client in the network. For example, the start time for a client could be computed using:

Start time=AID/(max(AID for all clients)*slot time)

If the AP does not immediately garbage collect AIDs, then there may be stale AIDs that lead to dead air time. Therefore, in one embodiment, clients may monitor the medium to identify which clients are active and to identify the AIDs associated with the active clients. Monitoring the medium may include, for example, monitoring beacon frames for information that identifies clients that have packets buffered at the AP. Given the information in the beacon, a client may determine an active AID and use that as a rank order among active AIDs. The slot time may then be computed using:

Start time=ACTIVE AID/(max(active AID)*slot time).

Some acronyms used herein include:
ACK: acknowledgement frame
DCF: distributed co-ordination function, a fundamental MAC technique of 802.11
DIFS: Distributed interframe space=SIFS+(2*slot time)
MAC: media access control
NAV: network allocation vector
PCF: point co-ordination function
PIFS: Priority interframe space=SIFS+slot time
SIFS: short interframe space, the time between a data frame and an ACK
TDMA: time division media access In one embodiment, clients may adapt their sleep behavior as a function of a traffic profile in the network. Adapting the sleep behavior may facilitate reducing contention between clients. With their sleep behavior adapted, clients may engage in atomic bursts of traffic to reduce contention and collisions. In one embodiment, a downlink burst may be separated from an uplink burst by an amount of time equal to SIFS+ACK. This amount of time seeks to ensure that other clients, even clients from outside the network, will not disrupt the downlink and uplink sequence of packets for a client.

Recall that clients determine when to send packets to the AP. The first packet from a client may be treated as a trigger for the AP to start de-queuing frames to the client. Unlike conventional systems, the AP will not initiate transmissions to the clients but will wait for trigger frames. The AP may still broadcast beacon messages. Clients can use different types of trigger frames. In one embodiment, a client may use a single packet trigger where the client sends one frame, which is then followed by a downlink burst from the AP and then followed by an uplink burst from the client. The burst may include multiple frames. In another embodiment, a client may use a burst trigger where the client sends an uplink burst before the AP sends a downlink burst.

Figure 18:
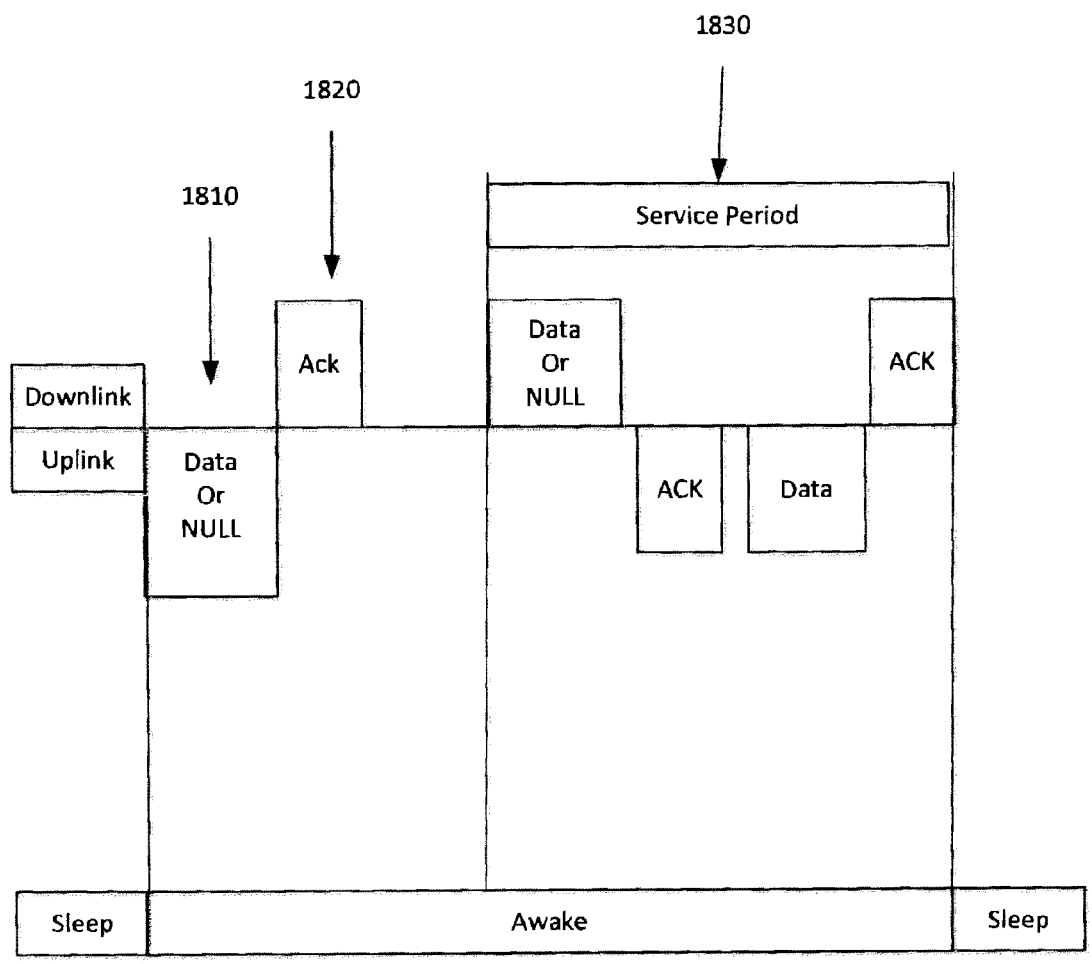
FIG. 18 illustrates message traffic associated with a single trigger.

FIG. 18 illustrates message traffic associated with a single trigger. In FIG. 18, a client wakes up and sends a trigger 1810. The trigger may be data or a null packet if there is no upstream traffic. The console may acknowledge the trigger 1810 with an ACK 1820. After sending the ACK, the AP will begin to serve the client and will continue to serve the client during the service period 1830. During the service period 1830, the AP and the client may exchange data and acknowledgements without engaging in another contention. The service period 1830 may continue until all the uplink and downlink packets have been exchanged between the AP and the client. The first downlink data packet can be a data packet or a null packet.

Figure 19:
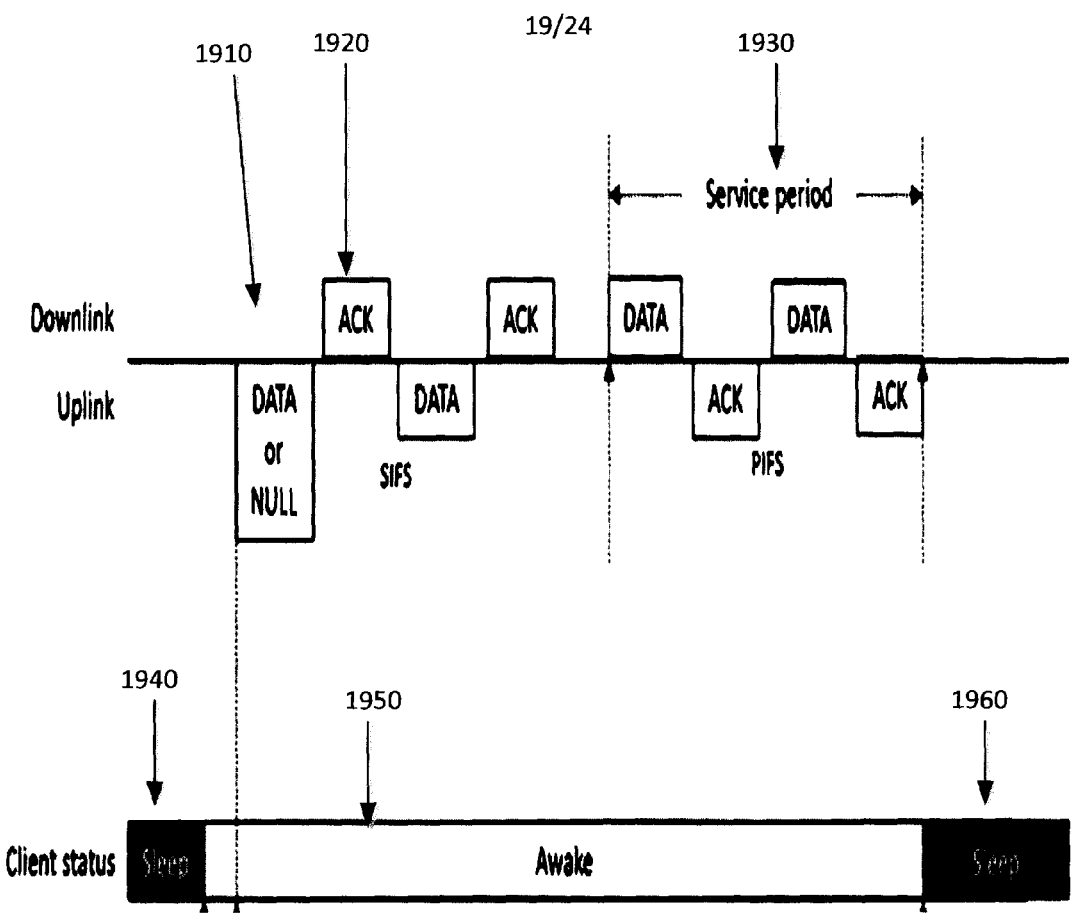
FIG. 19 illustrates message traffic associated with a trigger associated with a burst.

FIG. 19 illustrates message traffic associated with a trigger associated with a burst. A client is asleep at 1940, wakes up and stays awake during 1950, and then goes back to sleep at 1960. When the client wakes up, it contends and, after winning contention, sends trigger 1910. The AP acknowledges the trigger at 1920. After an SIFS period, the client may send data that is acknowledged by the AP. Later, during service period 1930, the AP will serve the client. The AP may service the client until all the scheduled uplink and downlink packets have been exchanged between the AP and the client. During service period 1930, data from the AP to the client may be separated by an ACK from the client. The data may be separated from the ACK by a value less than the DIFS period of time.

Contention may negatively impact the performance of wireless networks. Thus, contention may also negatively impact shared, wireless gaming systems. Contention may lead to collisions and may lead to increased latency. Latency is generally unacceptable in real-time gaming scenarios that have deadline driven traffic. Example methods and apparatus may reduce contention through packet aggregation across a link. For example, a receiver may send a data packet immediately after sending an ACK, which may allow the receiver turned transmitter to gain access to the medium before another contender. In one embodiment, contention may be reduced by reducing the number of steps in a handshake by, for example, using data as an ACK. In one embodiment, contention may be reduced by sending a data packet after waiting a period of time equal to, for example, ACK+SIFS. Sending the data packet within an SIFS interval may allow the data packet to be treated as an ACK, which may reduce contention. In another embodiment, the data packet may be sent within the PIFS of the ACK.

In one shared, wireless gaming environment where a console acts as an AP and communicates with a number of accessories (e.g., controllers) that act as clients, contention can be undesirable. Uplink frames travelling from the accessories to the console may delay the transmission of downlink frames from the console to the accessories. Using data as an ACK (DACK) may reduce contention and thus reduce this delay.

In one embodiment, a first station may receive a data frame from a second station. The first station may then check its outgoing data frame buffer to see whether it has a data frame(s) to send back to the second station. If there is a data frame waiting or ready to be sent, the first station may send out the outgoing data frame in a manner that allows the data frame to be treated as an ACK by the second station. Using DACK facilitates reducing a conventional "two-way" handshake in, for example, 802.11, into a "one-and-a-half way" handshake. In 802.11, for the AP and client to send a downlink and uplink data frame respectively, four transmissions are required: a downlink data, an uplink ACK, an uplink data, and a downlink ACK. By using an uplink DACK, the four transmissions can be reduced to three: a downlink ACK, an uplink DACK, and a downlink ACK.

Figure 20:
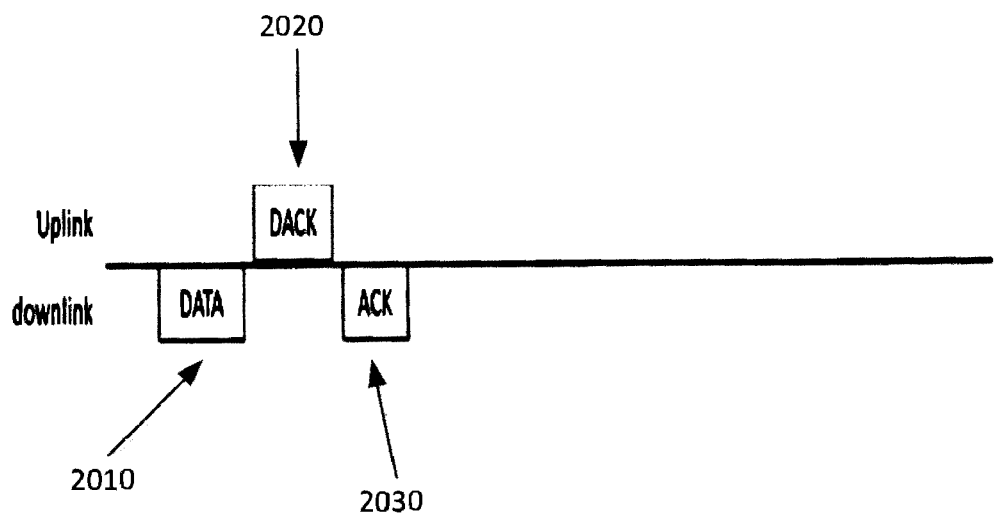
FIG. 20 illustrates data as acknowledgement (DACK) where a data packet is sent within the PIFS of an acknowledgement (ACK).

FIG. 20 illustrates DACK where a data packet is sent within the PIFS of an ACK. A client may send data 2010. The AP may then send DACK 2020. DACK 2020 may be an acknowledgement and data or may be an acknowledgement followed very quickly by data. The client may then respond to the DACK 2020 with an ACK 2030.

Figure 21:
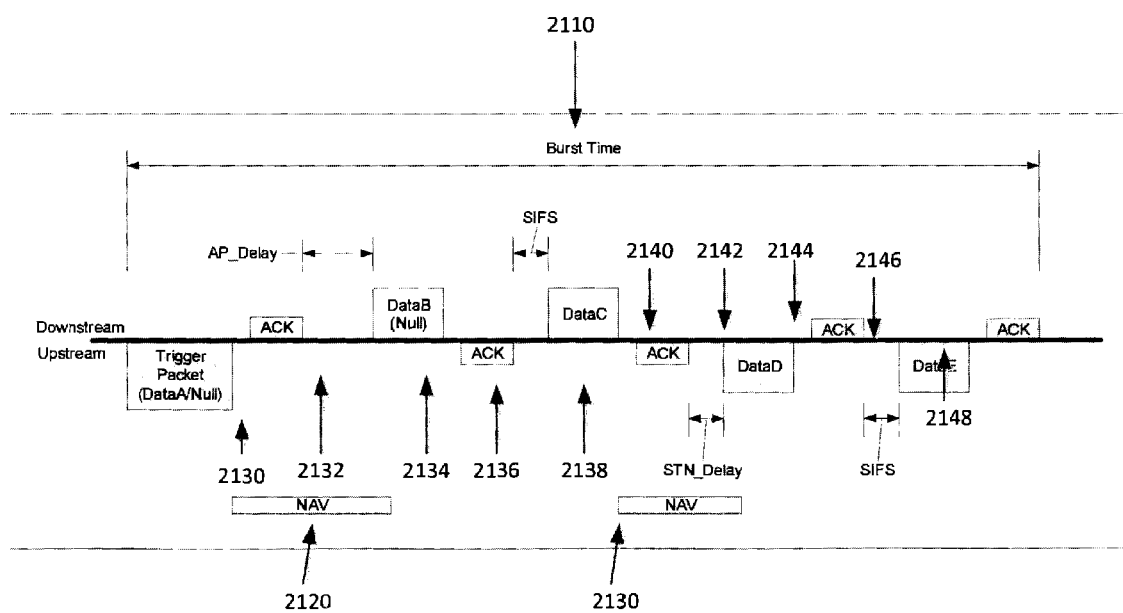
FIG. 21 illustrates DACK with data separated from the ACK by the access point (AP) turnaround delay time.

FIG. 21 illustrates another example of DACK. In FIG. 21, during burst time 2110, a client sends a trigger packet 2130 that the AP acknowledges. The NAV 2120 has been manipulated to accommodate the reality that the AP cannot instantaneously send data. The NAV 2120 has been lengthened so that DataB 2134 can be transmitted after the AP turnaround delay without the client losing the channel to another contending client. Note that the NAV starts at the end of a packet.

A client sends a trigger 2130. The AP acknowledges the trigger 2130 with ACK 2132. After the AP turnaround delay, the AP sends DataB 2134. The client acknowledges the DataB 2134 with ACK 2136. The AP does not then have to experience the entire AP turnaround delay because multiple frames may have been acquired during the AP turnaround delay. Therefore, after just the SIFS, the AP may send DataC 2138 which is acknowledged by ACK 2140. Since the client and the AP may engage in a bi-directional exchange, after a client turnaround delay, the client may send DataD 2142, which the AP acknowledges with ACK 2144. The client may then, after just the SIFS delay, send DataE 2146 which is acknowledged by ACK 2148. Since data can be sent after waiting just the SIFS, the data can serve as an ACK.

Figure 22:
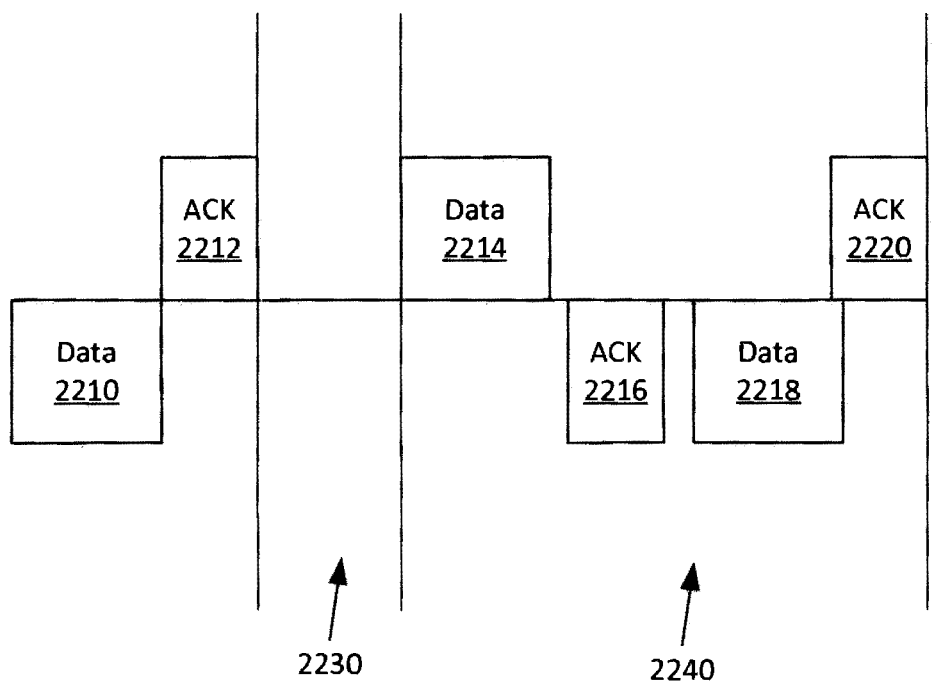
FIG. 22 illustrates a gap in an exchange between a client and an AP.

FIG. 22 illustrates a gap 2230 in conventional message exchanges where a second client may contend during an exchange between a first client and the AP and thereby disrupt the message exchange. In real-time gaming, traffic between an AP and a client may be bi-directional. In a shared, wireless gaming environment, performance may be improved if an AP can immediately send a downlink packet in response to uplink traffic. Similarly, performance may also be improved if a client can immediately send an uplink packet in response to downlink traffic. However, it may be difficult, if even possible at all, for either a client or an AP to send packets "immediately" after receiving packets. Instead, an AP or client may experience a turnaround delay before being able to respond to traffic.

For example, a client may send data 2210 that is acknowledged by ACK 2212. Before the AP can send data 2214, there may be a gap 2230. Conventionally, other clients or devices may attempt to transmit during the gap 2230 produced by the turnaround delay since, from their point of view, which includes carrier sensing, the medium is not being used during the turnaround delay. If a competing client is able to acquire the medium during the gap 2230 produced by the turnaround delay, then the bidirectional semantics may be broken, leading to compromised game play. Example apparatus and methods may prevent gap jumping by reconfiguring the NAV or by having clients sense the medium for a longer time when they wake up. By preventing gap jumping, the AP may send data 2214, which is acknowledged by ACK 2216 and then the client may send data 2218 which is acknowledged by ACK 2220. A bi-directional exchange can be performed in service period 2240 because other clients did not try to jump in during gap 2230.

Example methods and apparatus may manipulate the Network Allocation Vector (NAV) in, for example, the Duration ID of the received frame. The NAV may be set to a value that may prevent other clients in the network from sending packets during the turnaround delay. For example, the NAV may over-provision the duration ID of the frame to account for the turnaround time at the receiving node.

Over-provisioning the duration ID may resolve one issue, but may introduce a second issue. For example, another node that is not part of the message exchange may be asleep and miss the NAV. This other node may wake up and try to contend and acquire the medium. To prevent this scenario, nodes may be configured to sense the medium for a longer period of time or to contend for a longer period of time. The longer period of time may be selected as a function of the turnaround delay and may be configured to prevent the other node from trying to acquire the medium during a period of time associated with the turnaround delay. Additionally, example methods and apparatus may handle missed NAV packets by having clients sleep for longer periods of time.

In one embodiment, devices (e.g., console, accessory) may have multiple frame queues configured with different contention parameters. The multiple frame queues and different contention parameters may allow devices to handle packets in the beginning or ending of a burst. This facilitates reducing turnaround time at a device by allowing a receiving device to de-queue an outgoing packet in a fastest-available approach. Additionally, example methods and apparatus may be configured to have a receiving device start de-queuing an outgoing packet as soon as possible. For example, a receiving device may be configured to start de-queuing an outgoing packet as soon as the MAC header is decoded in an incoming packet, or when the first frame is decoded in an aggregated packet, or at other times.

Figure 23:
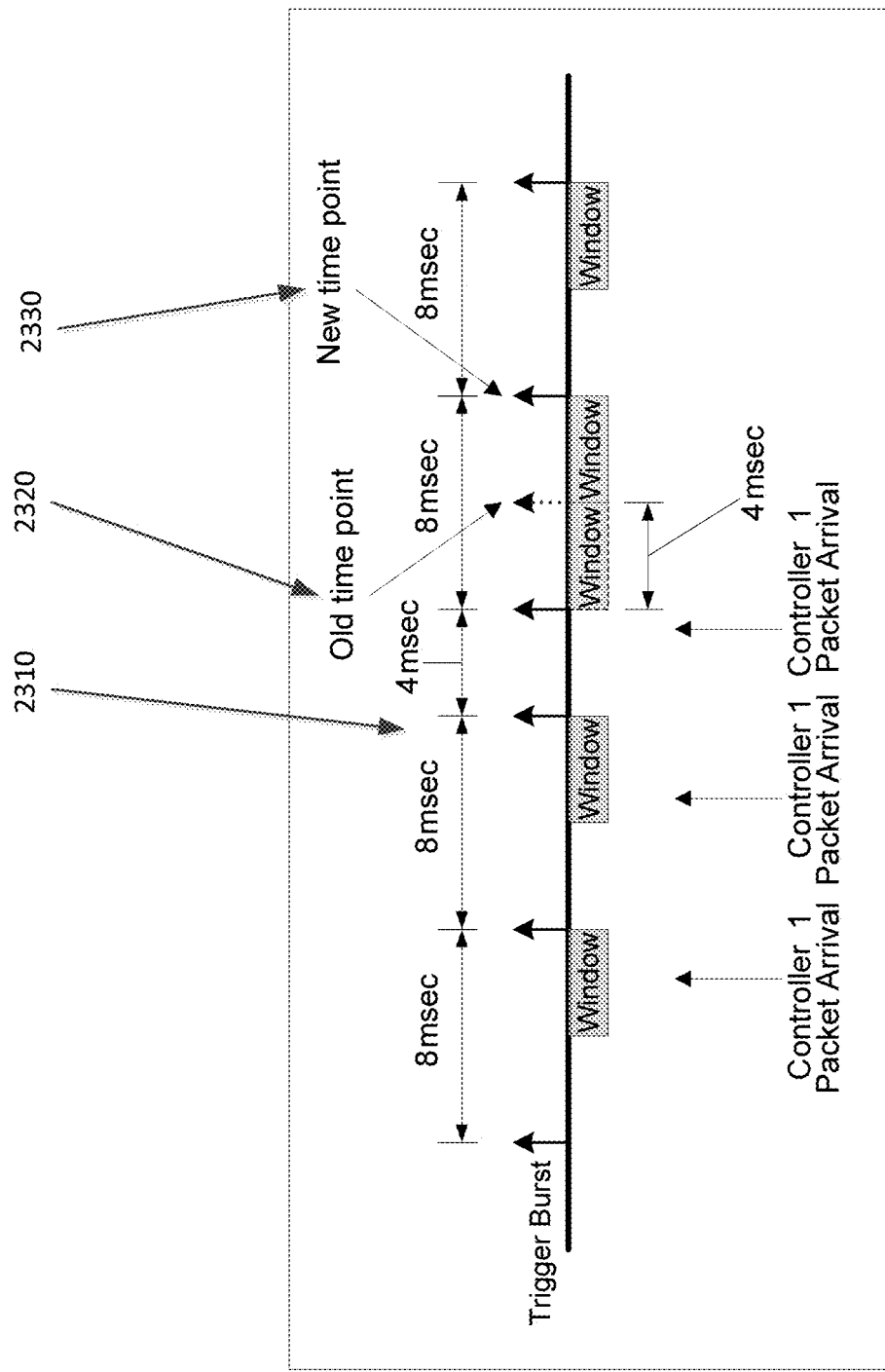
FIG. 23 illustrates adjustable frame timing associated with an exchange between a client and an AP in a shared, wireless gaming environment.

FIG. 23 illustrates frame timing. In one embodiment, the burst interval may be set to 8 ms. Thus, a client may send a trigger burst once every 8 ms to initiate the exchange of upstream and downstream packets. However, the 8 ms may be changed. Regardless of whether the burst interval is set to its default value or to a greater or smaller interval, the frame timing may be contingent on when the trigger packet is successfully delivered to the AP. The next time at which a trigger packet is to be sent by a client can be a function of the successful delivery of the last trigger packet. The successful delivery can be noted by receipt of an ACK from the AP.

To reduce upstream controller packet latency, trigger packets may be treated differently by the client. When upstream packets are received from an application, if the trigger time is more than a pre-defined interval (e.g., 4 ms) from the packet arrival time, the accessory radio may transmit the packet at the next pre-defined interval time point. The accessory radio may then reset the frame time to this new reference point. By sending at a time other than the pre-defined interval, packet latency may be removed.

In one example, a longer frame time (e.g., 8 ms) is pre-empted by a shorter (e.g., 4 ms) frame time under certain conditions. In the example illustrated in FIG. 23, as long as the application is sourcing packets within a 4 ms window of the occurrence of the upstream trigger burst, the accessory radio will maintain overall frame timing. However, when a packet arrives at a time outside the window, the accessory radio may re-time to the next 4 ms interval and exchange the old time point for the new time point. Once shifted, the new timing may continue. In one embodiment, if the accessory radio does not have a packet buffered when it is time to send a trigger packet, the accessory radio may send a Null data packet. Time shifting is illustrated in FIG. 23 where a series of 8 ms windows end at 2310. While a window ought to have appeared at 2320, the window may be delayed until 2330.

Figure 24:
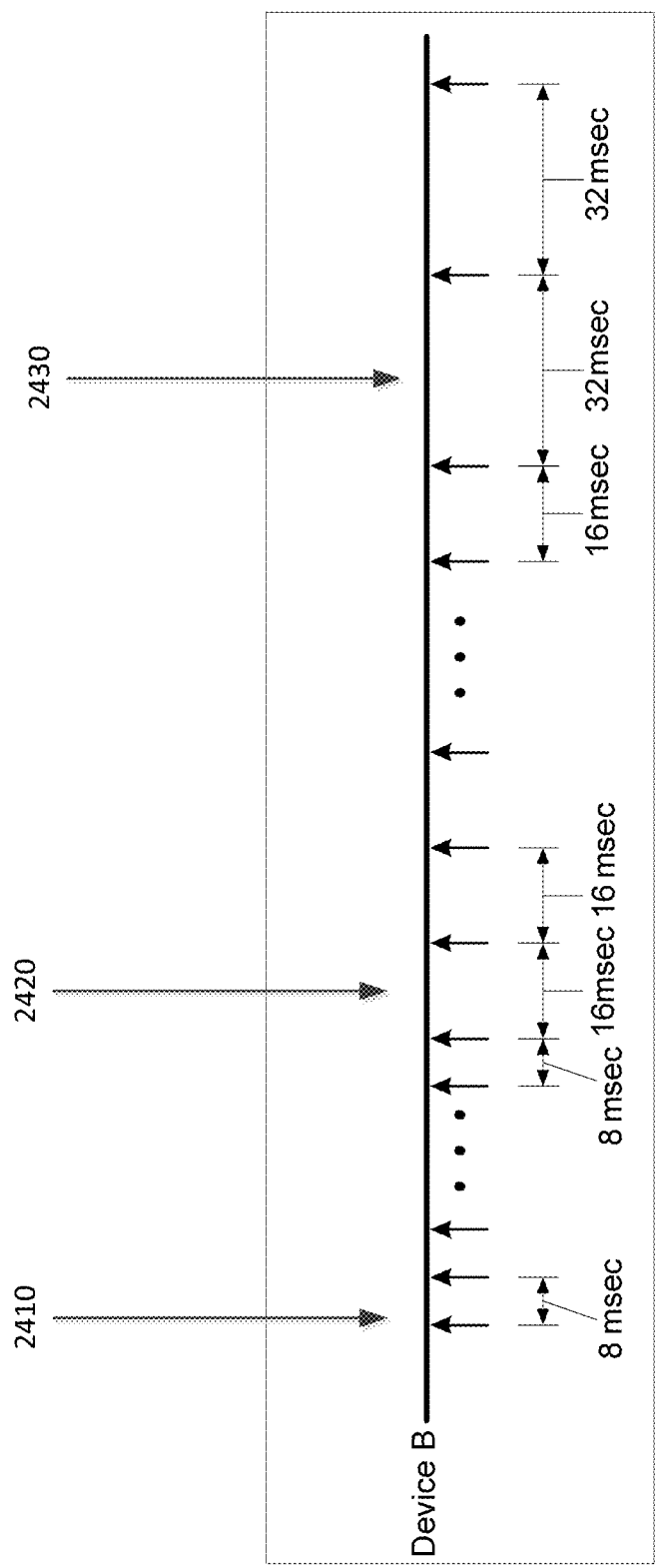
FIG. 24 illustrates changing frame timing associated with an exchange between a client and an AP in a shared, wireless gaming environment.

An accessory can decide when it wants to change the frequency of trigger packets. The accessory can decide to increase or reduce the frequency. FIG. 24 illustrates trigger packet frequency being decreased. Frequency may also be increased. At time 2410 the trigger frequency may be, for example 8 ms. At time 2420 the trigger frequency may be decreased to, for example, 16 ms. Then, at time 2430 the trigger frequency may be further decreased to, for example, 32 ms. Different trigger frequencies may be employed.

The radio in an accessory initiates communications with the console. Communication is initiated by sending an upstream trigger packet. The upstream trigger packet may or may not contain application data. The console radio receives the packet and sends downstream the packets that are buffered for that accessory. The accessory then sends further packets upstream to the console. This exchange may be referred to as a "burst." The bursts repeat periodically. The burst interval may be changed in response to application needs, network traffic, or as a function of other criteria. For example, when a controller is not being used for gaming, but is being used for some other activity (e.g., navigation, controlling video player playback), longer response time may be acceptable.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A gaming accessory comprising:
   a processor;
   a memory;
   logic configured to implement a wireless protocol to communicate with a gaming console in a wireless network; and
   an interface configured to connect the processor, the memory, and the logic;
   the logic being further configured to:
      contend with one or more other gaming accessories for access to a wireless communication medium for communicating with the gaming console;
      schedule a sleep time and a subsequent wakeup time for the gaming accessory;
      sleep for the scheduled sleep time; and
      at the subsequent wakeup time, communicate with the gaming console via the wireless communication medium.

2. The gaming accessory of claim 1, wherein the logic is further configured to:
   determine a completion time of a successful transmission from the gaming accessory to the gaming console; and
   determine the scheduled sleep time and subsequent wake time based at least on the completion time of the successful transmission.

3. The gaming accessory of claim 1, wherein the logic is further configured to:

determine the scheduled sleep time and subsequent wake time based at least on an identifier of the gaming accessory.

4. The gaming accessory of claim 1, wherein the logic is further configured to:
communicate with the gaming console by sending a single trigger packet to the gaming console and receiving two or more downstream packets from the gaming console responsive to sending the single trigger packet.

5. The gaming accessory of claim 1, wherein the logic is further configured to:
communicate with the gaming console by sending a trigger packet to the gaming console and receiving a data packet from the gaming console in response to the trigger packet; and
interpret the data packet as an acknowledgment of the trigger packet.

6. The gaming accessory of claim 1, the logic comprising one or more discrete hardware logic circuits.

7. A computing device comprising:
a processor; and
a memory storing instructions which, when executed by the processor, cause the processor to:
contend with one or more other computing devices for access to a wireless communication medium for communicating with an access point;
determine that contention for the wireless communication medium has successfully completed;
perform a first communication with the access point;
compute a next slot time for subsequent communication with the access point based on at least one of:
a time when the first communication successfully completed, or
an identifier of the computing device;
sleep until the next slot time arrives; and
upon arrival of the next slot time, perform a second communication with the access point.

8. The computing device of claim 7, wherein the instructions, when executed by the processor, cause the processor to:
compute the next slot time as a function of the identifier of the computing device and a maximum identifier from other identifiers of the other computing devices contending for the wireless communication medium.

9. The computing device of claim 7, wherein the instructions, when executed by the processor, cause the processor to:
compute the next slot time based at least upon a time when an acknowledgement is received from the access point, the acknowledgement indicating that the first communication successfully completed.

10. The computing device of claim 7, wherein the instructions, when executed by the processor, cause the processor to:
send trigger packets to the access point at a specified frequency, the trigger packets being sent during time slots determined by the computing device; and
increase the specified frequency at which the trigger packets are sent.

11. The computing device of claim 7, wherein the instructions, when executed by the processor, cause the processor to:
send trigger packets to the access point at a specified frequency, the trigger packets being sent during time slots determined by the computing device; and
decrease the specified frequency at which the trigger packets are sent.

12. The computing device of claim 7, embodied as a gaming accessory.

13. A system comprising the gaming accessory of claim 12 and the access point, wherein the access point is a gaming console.

14. A method comprising:
determining that a client device has successfully contended with other client devices for a wireless communication medium;
causing the client device to perform a first communication with an access point over the wireless communication medium;
causing the client device to compute a next slot time for subsequent communication with the access point based on at least one of:
a time when the first communication successfully completed, or
an identifier of the client device;
causing the client device to sleep until the next slot time arrives; and
causing the client device to, upon arrival of the next slot time, perform a second communication with the access point.

15. The method of claim 14, performed entirely by the client device.

16. The method of claim 14, further comprising:
causing the client device to collect utilization data reflecting an amount of air time used by the client device.

17. The method of claim 16, further comprising:
selecting a channel for the client device to communicate with the access point based at least on the utilization data.

18. The method of claim 14, further comprising:
collecting utilization data from a plurality of client devices reflecting respective airtime usage of the plurality of client devices;
aggregating the utilization data; and
sending beacon messages to the plurality of client devices, the beacon messages reflecting the aggregated utilization data.

19. The method of claim 18, further comprising sending the beacon messages at regular intervals.

20. The method of claim 18, further comprising:
receiving probe messages from the plurality of client devices, the probe messages conveying the respective airtime usage; and
sending the beacon messages in response to the probe messages.

* * * * *